(12) United States Patent  
Bannister

(10) Patent No.: US 8,786,123 B2  
(45) Date of Patent: Jul. 22, 2014

(54) TURBINE ASSEMBLY

(75) Inventor: Eric Bannister, Repton (GB)

(73) Assignee: Revoluter Limited (GB)

( * ) Notice: Subject to any disclaimer, the term of this patent is extended or adjusted under 35 U.S.C. 154(b) by 202 days.

(21) Appl. No.: 13/138,667

(22) PCT Filed: Mar. 18, 2010

(86) PCT No.: PCT/GB2010/000507
§ 371 (c)(1),
(2), (4) Date: Sep. 16, 2011

(87) PCT Pub. No.: WO2010/106337
PCT Pub. Date: Sep. 23, 2010

(65) Prior Publication Data
US 2012/0007362 A1    Jan. 12, 2012

(30) Foreign Application Priority Data
Mar. 20, 2009    (GB) .................................. 0904816.6

(51) Int. Cl.
*F03D 9/00*    (2006.01)
(52) U.S. Cl.
USPC .............................. 290/55; 415/4.3; 415/4.5
(58) Field of Classification Search
USPC ......... 290/44, 55; 415/4.1, 4.3, 4.5, 905, 908; 416/197 R, 197 A
See application file for complete search history.

(56) References Cited

U.S. PATENT DOCUMENTS

| | | | |
|---|---|---|---|
| 6,270,308 B1 | 8/2001 | Groppel | |
| 6,984,899 B1* | 1/2006 | Rice | 290/44 |
| 2007/0176428 A1* | 8/2007 | Nagao | 290/44 |
| 2009/0230686 A1* | 9/2009 | Catlin | 290/54 |
| 2012/0175879 A1* | 7/2012 | Keech | 290/44 |

FOREIGN PATENT DOCUMENTS

| | | | |
|---|---|---|---|
| CA | 2387434 A | 11/2003 | |
| DE | 2924970 A | 1/1981 | |
| DE | 3315439 A | 12/1987 | |
| DE | 19644890 A | 7/2013 | |
| EP | 1930585 A | 3/2010 | |
| JP | 2006266236 A | * 10/2006 | |
| WO | WO2009/009701 | 1/2009 | |

* cited by examiner

*Primary Examiner* — Tulsidas C Patel
*Assistant Examiner* — Viet Nguyen
(74) *Attorney, Agent, or Firm* — Schwartz Law Firm, P.C.

(57) ABSTRACT

A turbine assembly comprising, a rotor having a plurality of blades, and a shroud at least partially enclosing the rotor and adapted to expose a portion of the rotor. At least two shroud portions extend axially along the rotor and around the rotor to at least partially enclose the rotor. At least two shroud portions are rotationally adjustable. In use, the shroud defines a variable inlet and a variable outlet. The inlet area and outlet area are variable independently of each other. Adjustment of the area of the inlet area does not result in the same magnitude of adjustment in area of the outlet area. Adjustment of the position of the inlet area does not result in the same magnitude of adjustment of the position of the outlet area.

20 Claims, 26 Drawing Sheets

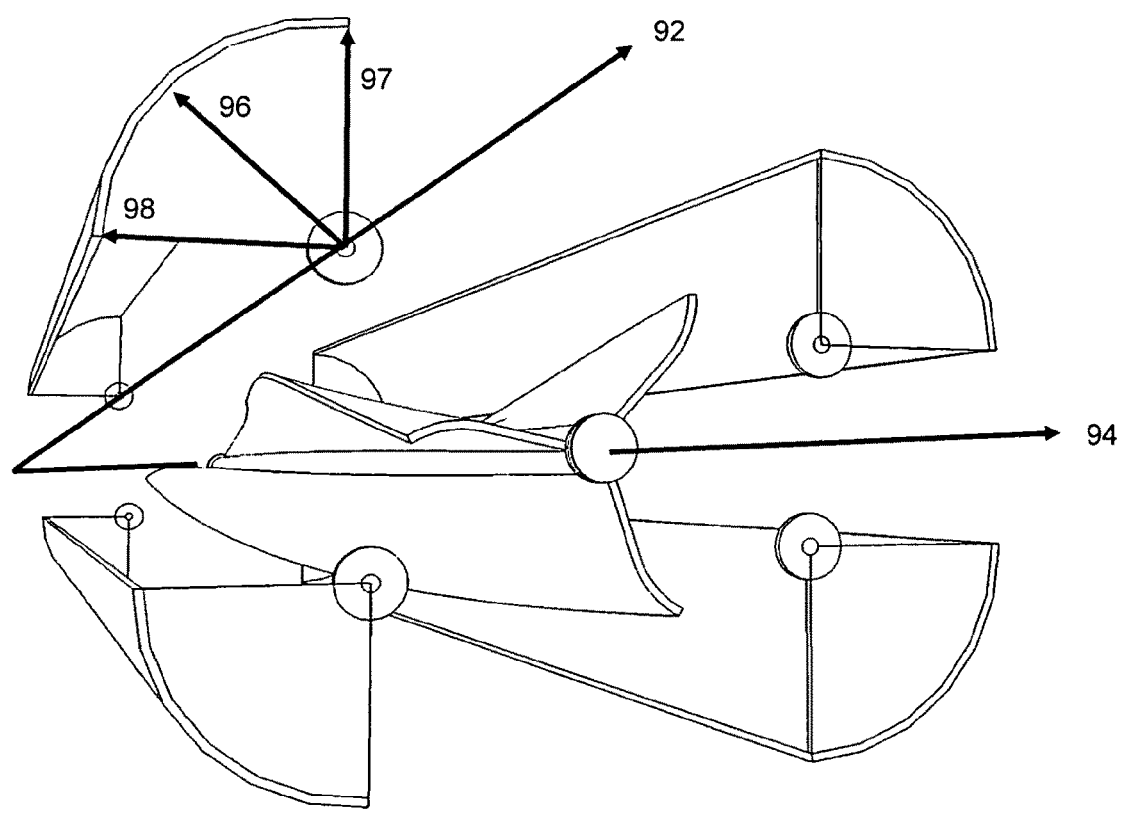
Fig 2.1

TURBINE ASSEMBLY

The invention relates to a turbine assembly and particularly a turbine assembly having a shroud.

There is an increasing interest in the generation of power from sustainable sources, driven primarily by the increasing cost of electricity and conventional fossil fuels, but also by environmental concerns relating to global warming and carbon emissions.

Wind turbines offer domestic and commercial consumers the possibility of using wind energy for at least some of their energy requirements. An example of a conventional small scale domestic wind turbine, consisting of a horizontal axis turbine with large open rotor blades, is described in International Patent Application PCT/GB2004/004859. There are however several problems with such conventional wind turbines when used in the vicinity of buildings, structures or inhabited areas. For example it is necessary to use a large mast structure to support the turbine. Such supporting structures become increasingly large, costly and complex as the size of the turbine increases. Additionally, due to practical limitations on the diameter of conventional turbines, an increase in energy demand above a certain level will require the installation of multiple turbines, further increasing the cost and complexity of the overall installation.

Turbines of the type described above can be characterised as axial flow turbines. This means that, for efficient operation, they require a free stream air flow which is substantially parallel to their axis of rotation. This is achieved by rotating the turbine axis to face into the direction of the oncoming wind.

A further problem with axial flow turbines is created by the rotor hub and associated generator assembly being located at a height above ground level of not less than the rotor radius plus the required blade tip clearance. The installation of the supporting mast together with the requirement to provide access to the rotor and associated generator components for maintenance and repair is both costly and difficult.

Axial flow turbines are sometimes unsightly and are often objected to on these grounds. Early examples of axial flow turbines were often noisy, although more recent designs have resulted in quieter installations.

In order to increase the output from the axial flow turbine beyond that achieved by increasing rotational speed and varying the blade pitch, it is necessary to increase the swept area of the rotor, which for a circular rotor means it is necessary to increase the rotor's diameter. This, in turn, results in an increase in the blade tip velocity. These high blade velocities can be dangerous to people and animals particularly in less regulated small scale/micro generation installations where recommended safety clearances from nearby structures or walkways may not be applied, or where recommended component overhaul or replacement intervals may not be strictly adhered to. Further to this, axial flow turbines with conventional open rotor blades are not best suited to turbulent airflows which are often found around built up or residential areas.

Axial flow turbines also require rotor blades which have a complex geometry in order to achieve optimum aerodynamic efficiency. The manufacture of this type of blade is both expensive and difficult, becoming increasingly so as the rotor diameter increases.

To overcome the above problems with axial flow turbines when applied to small scale installations in built-up or residential areas, it is known to employ a turbine assembly in which the wind direction is substantially perpendicular to the axis of the turbine. This alternative arrangement is often termed a transverse flow turbine.

An advantage of the transverse flow turbine is that the swept area of the rotor can be increased by increasing either or both of the rotor diameter and the rotor length. This in turn provides more flexibility in designing a transverse flow turbine for any given output, for example the diameter of the turbine may be reduced whilst maintaining the cross section of the turbine by increasing its length.

The transverse flow turbine is more practical for small scale power generation, particularly in built-up areas. For example, if an impulse rotor is incorporated into a transverse flow turbine, the turbine is more tolerant than an axial flow turbine to turbulent air flows, which are often found in built-up areas.

The geometry of a transverse flow turbine lends itself to being mounted along the apex of the pitched roof of a structure. This form of installation has several advantages over the installation of axial flow turbines in a similar location.

Firstly, although whilst not favouring either design, it must be noted that the wind speed at the apex of a roof is likely to be higher than that closer to ground level or in the lee of buildings and trees.

Secondly, there will be an increase in the wind speed at the apex of the roof as the wind flows up and over the structure. Transverse flow turbines are better suited to taking advantage of this increase in wind speed due to the shape of the air flow catchment area of the turbine.

Thirdly, when a transverse flow turbine is mounted above the apex of a pitched roof, it may be mounted close to the roof apex since the maximum wind speed will be in this region. Such an installation may be more easily installed and maintained and is therefore not subject to the structural constraints arising from the rotor and turbine hub being sited at the top of a tall mast.

Fourthly, being sited close to a roof apex, a transverse flow turbine installation is less visually obtrusive and would be unlikely to suffer from objections due to unsightliness to the same extent as would an axial flow turbine. The transverse flow turbine installed in this manner exhibits a significantly lower "visual footprint" than an axial flow turbine of similar output.

Fifthly, the lower blade tip velocities of the transverse flow turbine enable the turbine to have a lower noise signature.

Finally, a transverse flow turbine is able to be sited on a wide range of buildings of varying sizes and orientations including domestic residences, business and industrial buildings and storage warehouses. It also lends itself to other applications including installation on temporary structures and vehicles and for installation along the roof edge or as a vertical axis turbine on the corner of a building or structure which would experience a similar rise in wind speed as that experienced on a roof apex installation.

The installation of horizontal axis transverse flow wind turbines on the roofs of structures is known. For example, DE 196 44 890 A1 describes such an installation having a fixed shroud over the top of the turbine together a number of fixed guide vanes to direct the air flow. International Patent Application PCT/US2008/069705 also describes a roof mounted horizontal axis transverse flow turbine having a shroud around the turbine rotor together with a number of inlet guides for directing the air flow through the turbine. While each of these designs attempt to direct air flow through the turbine, neither design provides any significant control over the position of the shroud, vanes or guides to optimise the operation of the turbine in varying wind speeds. More significantly, neither design provides for optimal operation of the turbine in conditions of varying wind direction.

A significant problem with each of the above known designs is that their blade design and turbine geometry results in only part of the rotor cross section, which is exposed to the air stream, being able to extract energy from the air stream. In each of the known prior art designs, there is a portion of the rotor cross section which experiences a force resisting the rotation of the rotor, which therefore reduces the energy extracted from the air stream. This portion of the rotor is often termed the "dead sector".

According to a first aspect of the invention there is provided a transverse flow wind turbine assembly comprising, a rotor having a plurality of blades, and a shroud comprising at least two portions, at least partially enclosing the rotor, there being at least two shroud portions rotationally adjustable in order to expose a portion of the rotor to the wind.

Optionally, the movement of shroud portions being determined and controlled by a shroud control device.

The shroud portions can be positioned so as to cover that portion of the rotor in which the rotor blades are moving into the direction of the air stream and which would otherwise be reducing the efficiency of the turbine. This portion of the rotor is often termed the "dead sector"

Thus by means of the present invention it is possible to position the movable shroud portions such that the oncoming air flow impinges only on those rotor blades which are moving in the direction of the air flow. This maximises the output of the turbine assembly and increases its efficiency.

Optionally, the shroud portions define an inlet and an outlet.

The position of the shroud portions define an inlet and an outlet which represent respectively the area over which air enters the turbine assembly to impinge on the rotor, and the area over which the air is exhausted from the turbine assembly. The use of two or more shroud portions allows inlet and outlet areas to be independently or dependently variable in angular position and area whereby the inlet varies at a differing or variable amount to the outlet. The direction of movement and area change of the inlet may be in the same sense or the opposite sense to the outlet. A feature of the invention is that regardless of whether the inlet and outlet areas vary dependently or independently, adjustment of the inlet area or position does not result in the same magnitude of adjustment in area or position of the outlet in either the same or inverse sense.

In other words, two arrangements of inlet and outlet are envisaged, firstly wherein the shroud defines a variable inlet and a variable outlet whereby the inlet area and outlet area are independently variable in area and in angular position around the circumference of the turbine.

Secondly wherein the shroud defines a variable inlet and a variable outlet whereby the inlet area and outlet area are dependently variable in area and angular position around the circumference of the turbine, whereby adjustment of the area or angular position of the inlet area results in a different magnitude of adjustment of area or angular position of the outlet area.

A person skilled in the art could envisage a number of ways of achieving independent variability of the inlet and outlet areas, for example by actuating two or more shroud portions separately. Similarly dependant variability of inlet and outlet areas could be achieved in a number of ways, for example by actuating two or more shroud portions together with a single control actuator, each portion connected via gears or reverse drive mechanisms or both.

If the wind direction changes to come from substantially the opposite direction, from the other side of the turbine assembly or in the case of the roof apex installation, the other side of the roof, the inlet and outlet defined by the position of the shroud portions may be interchanged or any other adjustment made so as to direct airflows from the new direction.

In an alternative embodiment, the shroud portions may be positioned to define an open sector of the exposed rotor, rather than a separate inlet and outlet. An open sector is a portion of the rotor across or through which the air flows.

The use of two or more shroud portions allows the extent of the open sector to be varied by varying the upstream edge of the open sector, the downstream edge of the open sector, or both upstream and downstream edges dependently or independently whereby the upstream edge varies at a differing or variable amount to the downstream edge. The direction of movement of the upstream edge may be in the same sense or the opposite sense to the downstream edge. A feature of the invention is that regardless of whether the upstream and downstream edges vary dependently or independently, adjustment of the upstream edge position does not result in the same magnitude of adjustment in position of the downstream edge in either the same or inverse sense.

In other words, two arrangements of open sector are envisaged, firstly wherein the shroud defines an open sector, the open sector being variable in area and angular location around the circumference of the turbine, the open sector being varied by varying the angular position of upstream and downstream edges of the open sector whereby the upstream and downstream edges are independently variable.

Secondly wherein the shroud defines an open sector, the open sector being variable in area and angular location around the circumference of the turbine, the open sector being varied by varying the angular position of upstream and downstream edges of the open sector whereby the upstream and downstream edges are dependently variable, whereby adjustment of the angular position of the upstream edge results in a different magnitude of adjustment of the downstream edge.

A person skilled in the art could envisage a number of ways of achieving independent variability of the open sector upstream and downstream edges, for example by actuating two or more shroud portions separately. Similarly dependant variability of open sector upstream and downstream edges could be achieved in a number of ways, for example by actuating two or more shroud portions together with a single control actuator, each portion connected via gears or reverse drive mechanisms or both.

If the wind direction changes to come from substantially the opposite direction, from the other side of the turbine assembly or in the case of the roof apex installation, the other side of the roof, the open sector defined by the position of the shroud portions may be reconfigured or adjusted so as to direct airflows from the new direction.

A further embodiment is envisaged with a combination of inlet/outlet and open sector shroud regimes, wherein a direction of the airflow from one side of the turbine assembly, results in the shroud defining a variable inlet and a variable outlet, conversely when the airflow is from another substantially opposite direction, from the other side of the turbine assembly, the shroud defines an open sector, the open sector being variable in area and angular location around the circumference of the turbine, the open sector being varied by varying upstream and downstream edges of the open sector.

In this embodiment featuring a combination of inlet/outlet and open sector shroud regimes, optionally one direction may be preferable and the other substantially opposite direction, from the other side of the turbine assembly or in the case of the roof apex installation, the other side of the roof may be less preferable.

Whilst transverse flow turbines with rotatable substantially arc shaped shrouds are known in Patent Applications CA2387434A1, DE2924970A1, U.S. Pat. No. 6,270,308B1, EP930585A2, DE3315439A1, non of these articles feature the ability to vary inlet and outlet portions independently of each other or vary the inlet a different amount to the outlet. Similarly non of the prior articles allow an open sector to be varied by varying the upstream and downstream edges of the open area independently of each other or by varying the upstream edge a different amount to the downstream edge.

In addition, the shroud portions may block the air flow entering the rotor, for example when the turbine assembly is not in use or to protect it during hazardous environmental conditions.

The movement of shroud portions is controlled by the controller or control device in response to any number of inputs, for example in response to changes in wind speed, direction, temperature, pressure, humidity and vibration. This allows the turbine assembly to operate at optimum efficiency in varying conditions.

Alternatively, one or more shroud portions could be self-controlling with movement of the shroud portion being controlled by aerodynamic forces acting on the blades and/or on the shroud itself.

Optionally, one or more shroud portions may be rotatable.

The one or more shroud portions may be rotated about an axis which is co-axial with or is close to the axis of rotation of the rotor. This enables the degree of exposure of the rotor to the oncoming air stream to be varied from zero, where the rotor receives none of the oncoming flow, to full, where the complete rotor is exposed to the oncoming flow.

The degree of exposure of the rotor to the oncoming flow can be controlled by the controller in response to changes in one or more parameters such as: wind speed; wind direction; temperature; pressure; humidity; vibration; and user requirements.

The shroud portions may be positioned so as to completely enclose the rotor when the turbine assembly is not in use. This protects the turbine assembly from damage which, for example, might be caused by operation in hazardous environmental conditions. Where shroud portions do not have sufficient angular coverage to allow complete enclosure of the rotor, it may be possible to shroud the portion of the rotor exposed to the wind thereby achieving the same effect.

The shroud may comprise between 2 and 4 shroud portions, although the shroud could have any number of shroud portions. An advantage of the shroud comprising a plurality of shroud portions is that it allows for more variation in the degree of shrouding provided to the rotor.

Optionally, each shroud portion is substantially arc shaped in cross section.

Each shroud portion extends axially along the length of the rotor and includes a plate at each end. Each end plate connects the axial portion of the shroud portion to the axis of rotation of the shroud portion.

The shroud portions are shaped so as to fit closely over the rotor, whilst still having sufficient clearance to rotate so as to expose a portion of the rotor.

This allows for a more compact, simpler, more structurally sound and less visually intrusive installation.

Optionally, one or more shroud portions are spaced apart transversely from the axis of rotation of the rotor by a distance that is different to the distance by which the one or more other shroud portions are spaced apart transversely from the axis of rotation of the rotor.

In other words one or more shroud portions each have a radius that is different to the radius of each of the one or more other shroud portions.

In some embodiments, each shroud portion has a radius that is different from the radius of each other shroud portion forming the shroud.

This allows at least one of the shroud portions to rotate about an axis coaxial with, or close to the rotor axis of rotation and pass over or under adjacent shroud portions so as to be able to expose or cover a part or all of the rotor, thus providing complete flexibility in the positioning of the shroud portions relative to the rotor.

In another embodiment of the invention comprising pairs of shroud portions, a shroud portion of a respective pair may have substantially the same spacing from the axis of rotation of the rotor as the other shroud portion of that pair, and the shroud portions of one pair may each have a different spacing from the axis of rotation of the rotor as the shroud portions of each other pair.

Optionally, the distance by which one or more shroud portions are spaced apart, transversely from the axis of rotation of the shroud portion, varies with the angular position of the respective shroud portion relative to the axis of rotation of the shroud portion.

In other words, the radius of a shroud portion relative to the axis of rotation of the shroud portion varies with the changing angular position of the shroud portion as it rotates about the axis of rotation of the shroud portion.

In some embodiments, only one shroud portion may have a radius that varies in this manner, whilst in other embodiments more than one shroud portion, or all shroud portions may have such a variable radius.

Optionally, the distance by which one or more shroud portions are spaced apart, transversely from the axis of rotation of the shroud portion, varies with the angular position around the respective shroud portion.

In other words the radius at one edge of a shroud portion relative to the axis of rotation of the shroud portion is different to the radius at the other edge of the shroud portion (assuming an edge lies parallel to the axis of rotation of the shroud portion).

The two features described above enable the clearances between the rotor blade tips and the inner surface of the shroud portions to be varied to optimize the shrouding of the turbine.

A further advantage of these features is that they increase the angular range of motion of the shroud portions by enabling the partial overlap of two shroud portions which would not otherwise be possible if the respective shroud portions had substantially equal radii. This partial overlapping may result in the shroud portions abutting one another, the inner surface of one shroud portion abutting the outer surface of another shroud portion thus increasing the rigidity of the shroud portions.

Optionally, the axis of rotation of one or more shroud portions and the axis of rotation of the rotor are coaxial.

Advantages of the shroud axis being coaxial with the rotor axis include simplification of both the construction of the turbine and the control of the movement of the shroud portions. This results from the shroud portions and the rotor having a common pivot point and control axis.

Optionally, the axis of rotation of one or more shroud portions are offset from the axis of rotation of the rotor.

This feature provides for a variable clearance between the rotor blade tips and the inner surface of the shroud portions. The movement of the shroud portions can thus be configured to provide the optimal blade tip clearance around the periphery of the rotor.

Optionally, the axis of rotation of one or more shroud portions varies relative to the axis of rotation of the rotor as the one or more shroud portions rotate.

This allows further optimization of blade tip clearances and turbine shrouding.

Optionally, the turbine assembly further comprises an actuator. The actuator may be operably connected to the controller.

The actuator enables the position of one or more shroud portions to be varied in response to commands from the controller, for example in response to varying wind speed, direction, temperature, pressure, humidity and vibration.

A plurality of actuators may be employed in order to be able to vary the position of each shroud portion independently of each other shroud portion. This enables the position of each of the plurality of shroud portions, relative to the rotor, to be independently varied depending upon environmental conditions and a user's requirements.

Optionally, one or more of the shroud portions includes an inlet guide extending axially along the shroud portion.

The purpose of the inlet guide is firstly to direct incoming air flows in the plane of the rotor axis such that they impinge upon the rotor blade face at the optimum angle. Secondly, the inlet guide serves to increase the volume of air flow which is directed onto the rotor without unshrouding more of the rotor. Thirdly, the inlet guide serves to accelerate the air flow entering the turbine assembly by reducing the cross sectional area through which the air flow passes. Fourthly, the inlet guide serves to direct incoming cross wind air flows to a direction more normal to the axis of the rotor. Purposes of the inlet guide described above may be incorporated individually or in any combination.

Optionally, one or more of the shroud portions includes an exhaust guide extending axially along the shroud portion.

The purpose of the exhaust guide is to provide optimal exhaust conditions by reducing the exhaust drag. This is achieved by lowering the air pressure immediately downstream of the exhaust by increasing the cross sectional area through which the flow passes.

Optionally, one or more shroud portions comprises a flow reversal device.

The purpose of the flow reversal device is to reduce the angular extent of the dead sector of the turbine assembly. The flow reversal device enables blades otherwise located in the dead sector to extract energy from the flow. In other embodiments the flow reversal device may also increase the mass flow through the rotor.

This increases the useful motive air flow into the inlet side of the turbine assembly. It also assists in changing the direction of this additional air flow so that it impinges on the rotor in such a way as to enable it to contribute positively to the useful work produced by the turbine assembly.

Optionally, one or more shroud portions includes a plurality of apertures.

The apertures allow air to be drawn from inside the shroud into regions of low pressure above the top of the turbine assembly, and in the lee of the turbine assembly.

By drawing air out from the dead sector of the rotor, the pressure within the enclosed dead sector is reduced and consequently the drag on the rotor dead sector is also reduced, which increases the efficiency of the turbine assembly.

Optionally, the rotor further comprises a hub, each of the plurality of blades being attached to the hub.

By mounting the rotor blades on a central hub, the rotor construction becomes simpler.

In one embodiment, each of the blades projects perpendicularly from the hub, which further simplifies the construction of the rotor In another embodiment, each of the blades may have a curved portion at their tip. In this arrangement, the curved portions at the tips of the blades improve the efficiency of the rotor when used in air flows which are directed towards the concave side of the curved portion of the blade. The curved tips cause the blade to exhibit a different amount of drag on either side, the rotor will therefore rotate in one direction.

In yet another embodiment, the rotor may have two separate curved blades which are oriented so as to overlap at their inner edges. This rotor arrangement is commonly known as a Savonius geometry. In this embodiment the blades are not attached to the hub, since the rotor may constructed without a hub.

In this arrangement, the degree of curvature on each of the curved blades can be varied, for example with the innermost portion of each blade being substantially linear and each blade being positioned to provide a degree of overlap between the inner edges of the blades. The gap between the inner edges of the two blades is configured to allow a portion of the air flow impinging on one blade to "cross feed" to the opposite blade thus providing additional motive power to the rotor.

The rotor may include between 2 and 20 blades, and preferably includes between 2 and 5 blades.

Optionally, each of the plurality of blades extends axially along a part of the hub, each blade adjoining the hub substantially parallel to the axis of rotation of the rotor.

While a rotor having this blade arrangement is simple, the initial starting of the turbine may be more difficult. This is because, for a given angular start position of the rotor together with the blade spacing and the shroud position, it is possible that none of the blades is positioned substantially perpendicularly to the air flow.

Optionally, each of the plurality of blades extends along a part of the hub, each blade adjoining the hub in a helical path along the length of the rotor, the outermost edge of each blade forming a helix and the surface of each blade forming a helicoid.

By providing a turbine blade which extends helically around the hub, at least part of each blade is always positioned substantially perpendicularly to the oncoming air flow. In this way, the turbine may 'self start' from any angular start position (assuming that the rotor spiral twists through at least 360°/(number of blades)).

A further advantage of the helical blade geometry is that the power output from the turbine is smoother because at least part of each blade is always exposed to the oncoming air flow (assuming that the rotor spiral twists through at least 360°/(number of blades)). This results in lower levels of noise and vibration when compared to a rotor having a parallel blade configuration.

The degree of helical twist on the blade can be varied at the time of manufacture to provide a rotor performance which is optimised for a particular wind speed and direction.

A rotor having a blade with a single helical geometry may be optimised for operation in cross winds from one end of the rotor.

Optionally, each of the plurality of blades extends along a part of the hub, each blade adjoining the hub in a path along the length of the rotor, the path being formed by a right handed helix originating at one end of the hub, and a left handed helix originating at the opposite end of the hub, the two opposing helical paths meeting between the ends of the hub, the outermost edge of each blade forming opposing helices and the surface of each blade forming opposing helicoids.

By employing a double helical geometry for the rotor blades, one portion of the rotor may be optimized for operation in cross winds from one end of the rotor while the other portion of the rotor may be optimized for operation in cross winds from the opposite end of the rotor.

In other embodiments, the rotor blades may be offset from one another rather than being mounted on the hub. In such embodiments, the blades may be offset from one another in a Savonius type geometry, for example, although the blades could have any suitable geometry.

Optionally, the rotor further includes a plurality of separator discs, each disc being located concentrically on the rotor, with the plane of each disc being normal to the axis of rotation of the rotor, each disc being spaced along the length of the rotor so as to divide the rotor into segments.

The separator discs limit spanwise flows, which are air flows substantially along the direction of the axis of the rotor, and thus they allow energy to be transferred from the air stream to the rotor, equally across the span of the rotor and in the area where the air first impinged upon the blades. Separator disks may take the form of solid disks, perforated disks or partial disks.

Optionally, each rotor segment is offset by an angular increment from adjacent rotor segments.

This feature provides for modular construction of the rotor making construction, assembly and maintenance easier.

By offsetting adjacent segments of the rotor, a linear blade geometry may be used to create a pseudo-helical rotor blade geometry which assists in providing a 'self starting' function to the turbine assembly.

Optionally, the turbine assembly further comprises a vibration sensor for measuring vibration of the turbine assembly.

The vibration sensor can be used to provide an indication of the operational efficiency of the turbine assembly, and also to enable early warning of failure and damage.

If the vibration sensor detects an anomalous vibration, this may be an indication of a condition which might adversely affect the performance of the turbine assembly, for example, damage to a rotor blade or other part of the turbine assembly.

According to a second aspect of the invention there is provided a method of operating a transverse flow wind turbine assembly comprising a rotor having a plurality of blades, and a shroud comprising at least two portions at least partially enclosing the rotor wherein at least two portions of the shroud are adjustable in order to expose a portion of the rotor to the wind, the rotor being connected to an electrical generator; the method comprising the steps of:

adjusting the position of the shroud portions;

determining the electrical power output from the electrical generator; and repeating the above steps in order to achieve peak electrical power output from the electrical generator.

Optionally, the turbine assembly further comprising a plurality of sensors, each sensor being adapted to sense a variable, the method comprises the additional initial steps of:

receiving an input from one or more of the plurality of sensors;

comparing the input to a predetermined value; and using the results from the comparison step to determine the required adjustment to the position of the shroud.

The input which is received from the one or more sensors may be compared to either a preset value, or a previously measured value from one or more of the sensors, or a value determined from a "look-up" table.

Alternatively, the input received from the one or more sensors may be compared to an other predetermined value.

Optionally, the variable is selected from the group comprising: wind speed; wind direction; temperature; humidity; vibration; and pressure.

According to a third aspect of the invention there is provided a roof for a building comprising a transverse flow wind turbine assembly according to the first aspect of the invention, the roof comprising an apex, the turbine assembly being positioned substantially parallel to the apex of the roof.

In the exemplary embodiment, the turbine would be mounted substantially above the apex of the roof, however the location may be to one side of the apex and thus as a result may be located at or below the height of the apex of the roof depending upon roof pitch angle and turbine diameter. In other embodiments the turbine may be located beneath the roof.

According to a fourth aspect of the invention there is provided a plurality of turbine assemblies according to the first aspect of the invention, the plurality of turbine assemblies installed in series along the apex of a roof, wherein the rotors of alternate turbine modules are contra-rotating, a generator coupled centrally between alternate modules, the rotor of one module driving the stator of the generator and the rotor of the adjacent module driving the rotor of the generator.

The optional contra-rotating feature allows the possibility of turning the generator at a faster rotational speed by driving the stator and rotor of an electrical generator in opposite directions.

Optionally each turbine assembly drives an electrical generator, the electrical outputs from each respective electrical generator being connected to a local electrical power distribution network, the electrical power generated by the turbine assemblies being supplied to local consumers in response to their electrical power requirements, in preference to the supply of electrical power from a remote generating site. Optionally, electrical outputs from other devices using renewable energy, such as photovoltaic cells, may be connected to the local electrical power distribution network.

Optionally, each of the turbine assemblies is mounted on a structure.

Optionally the structures may be close to or adjacent to one another.

There now follows a description of preferred embodiments of the invention, by way of non-limiting example, with reference being made to accompanying drawings in which:

FIG. 1 is a perspective view of a turbine assembly according to a first embodiment of the invention comprising a shroud having four shroud portions, showing the shroud portions in a first position enclosing the rotor. The turbine is preferably installed over the apex of a pitched roof of a structure, the rotor axis being substantially parallel to the apex of the roof, the roof under the turbine assembly is omitted from this figure;

FIG. 2 is a an exploded view of the turbine assembly of FIG. 1;

FIG. 2.1 is a an exploded view of the turbine assembly of FIG. 1 showing axes of rotation of the rotor and of one of the shroud portions;

Figure 5:
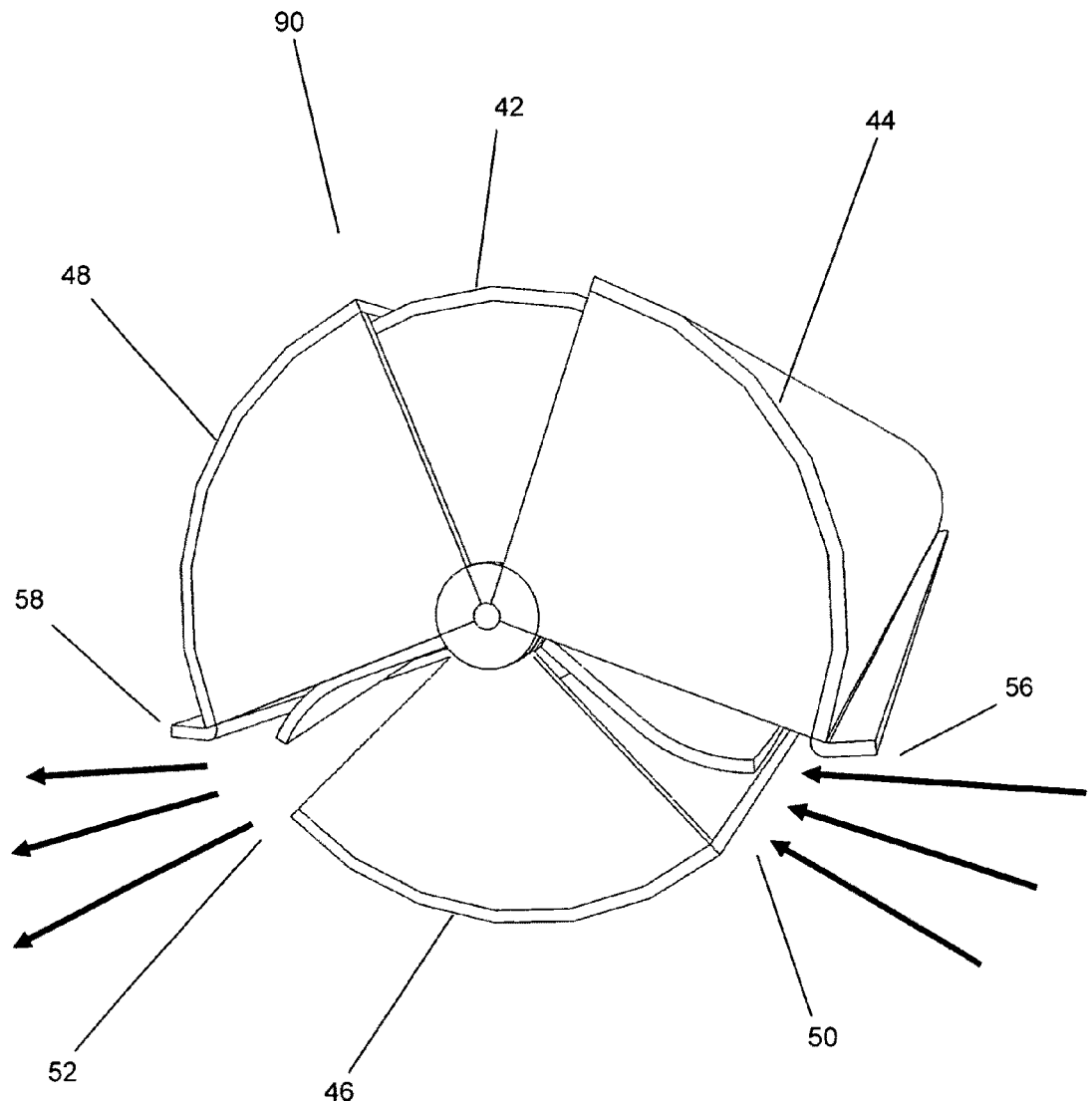
Figure 6:
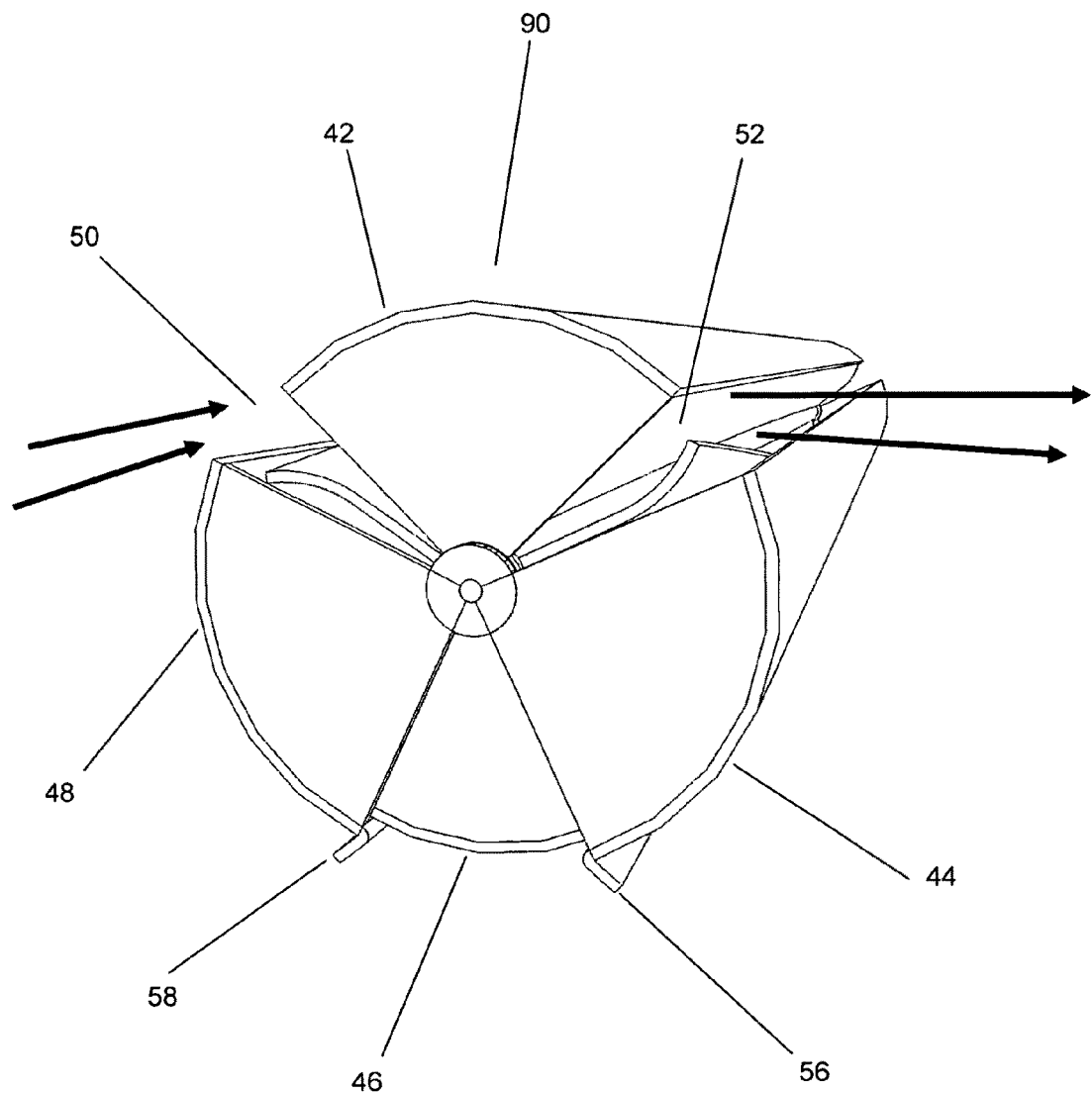
Figure 7:
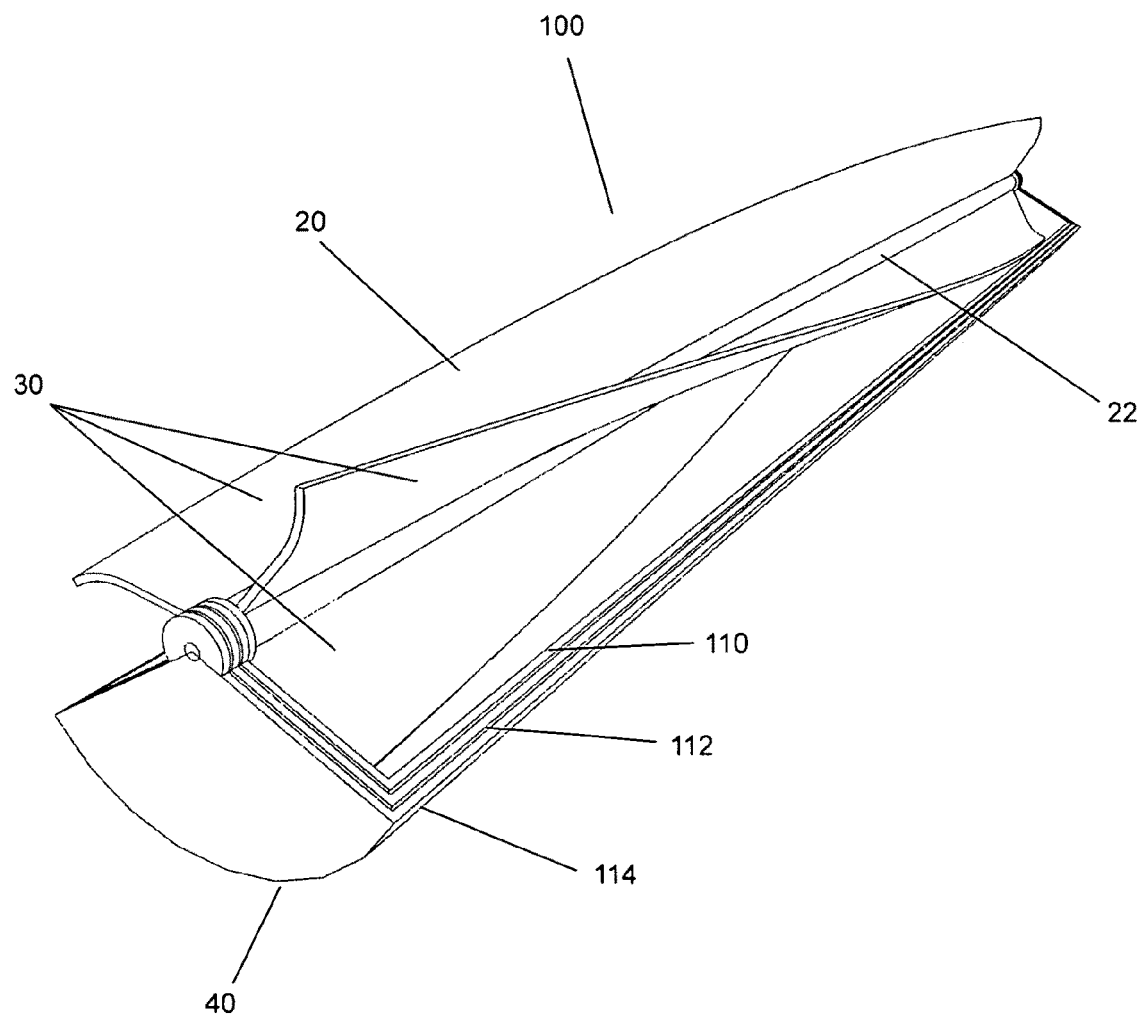
Figure 8:
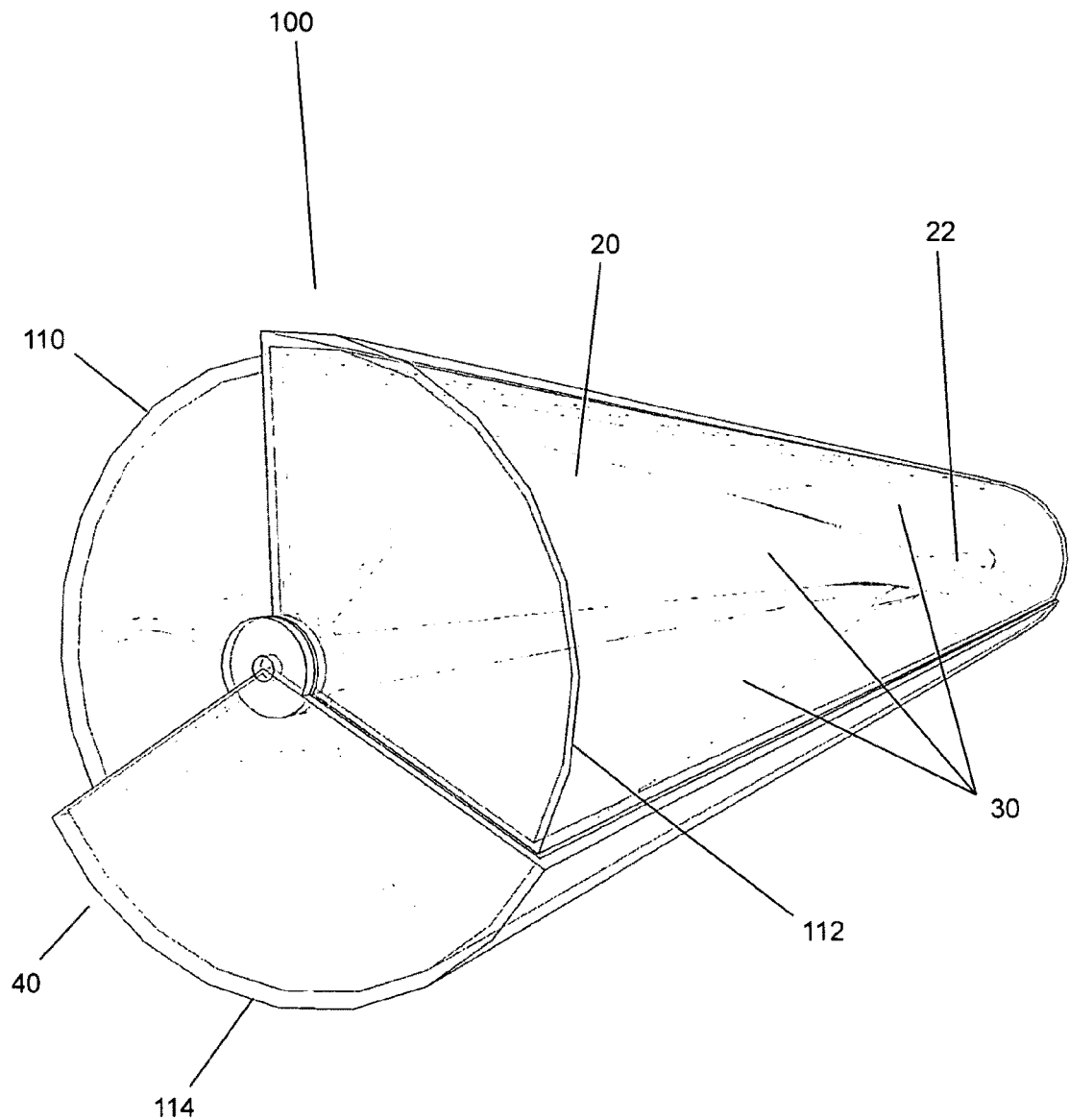
Figure 9:
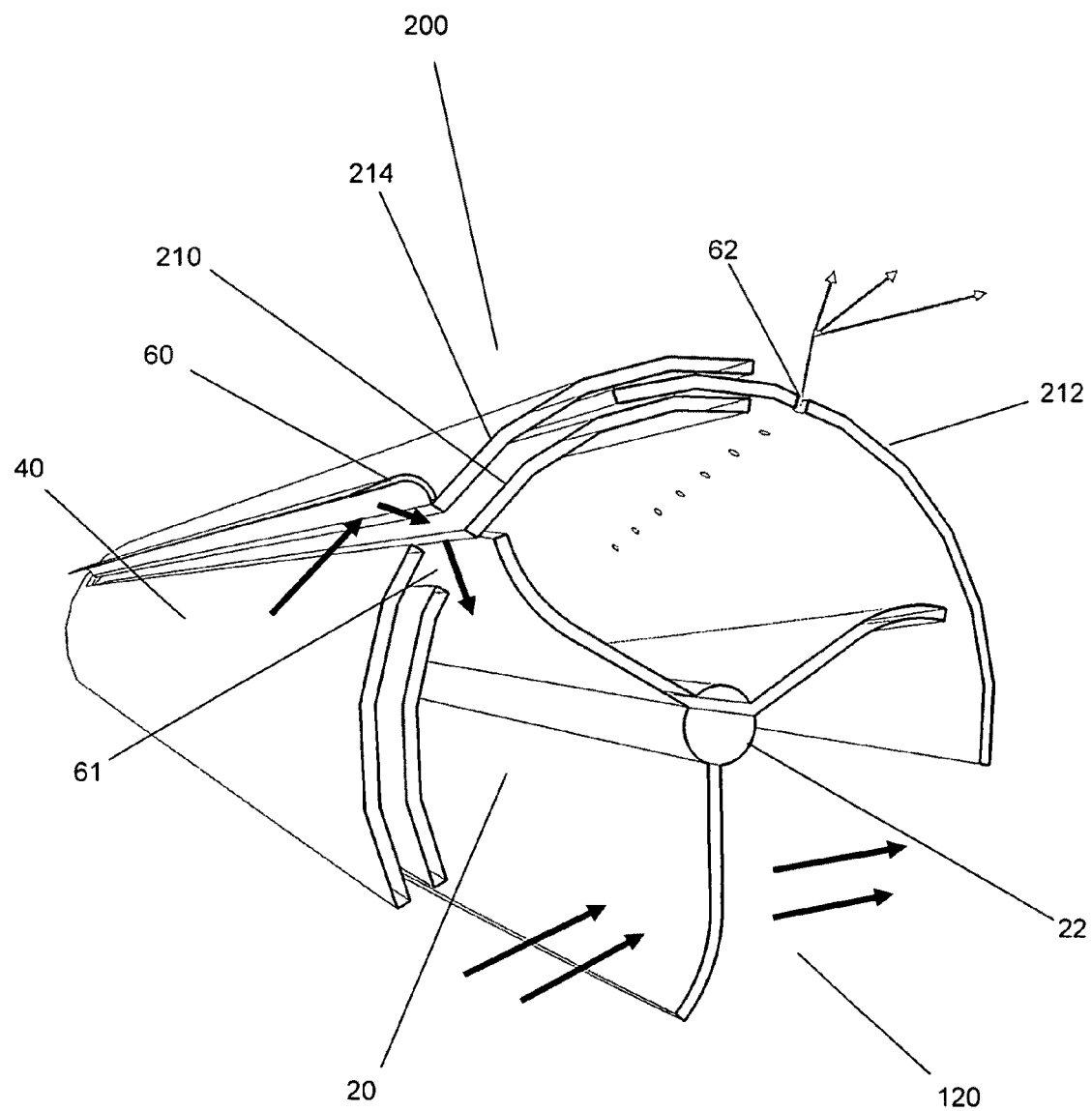
Figure 10:
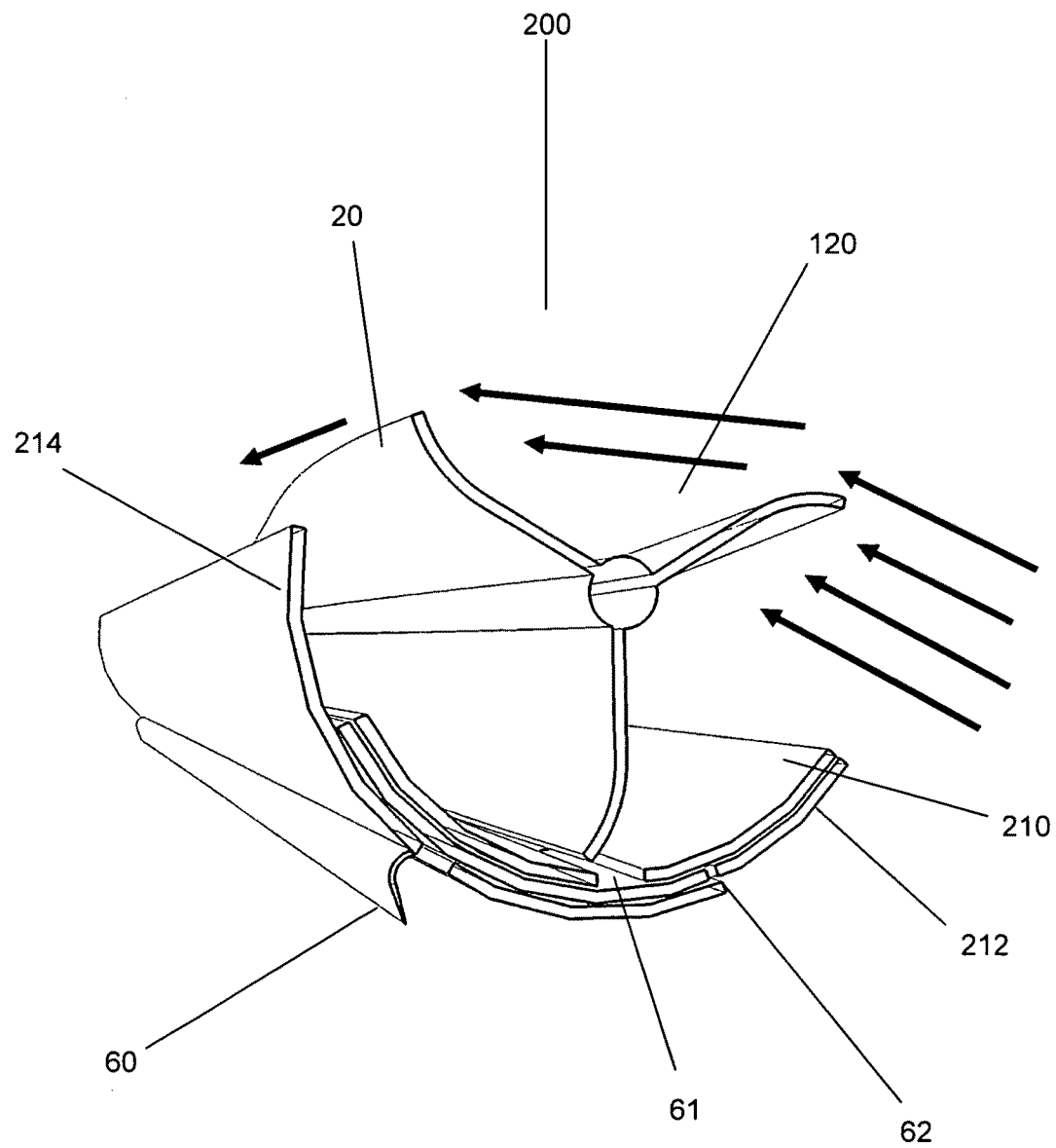
Figure 11:
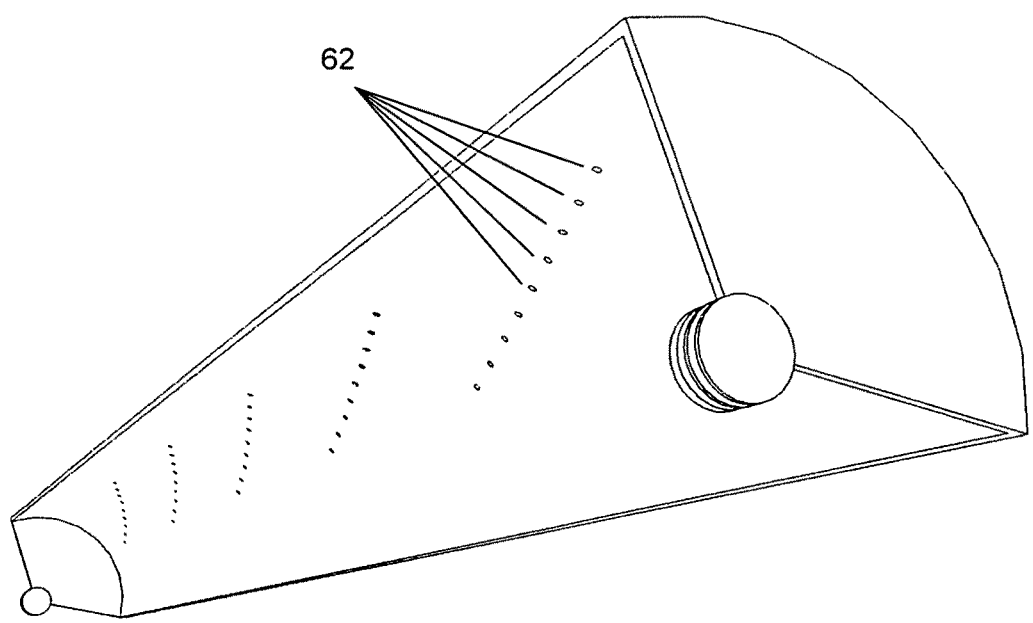
Figure 12:
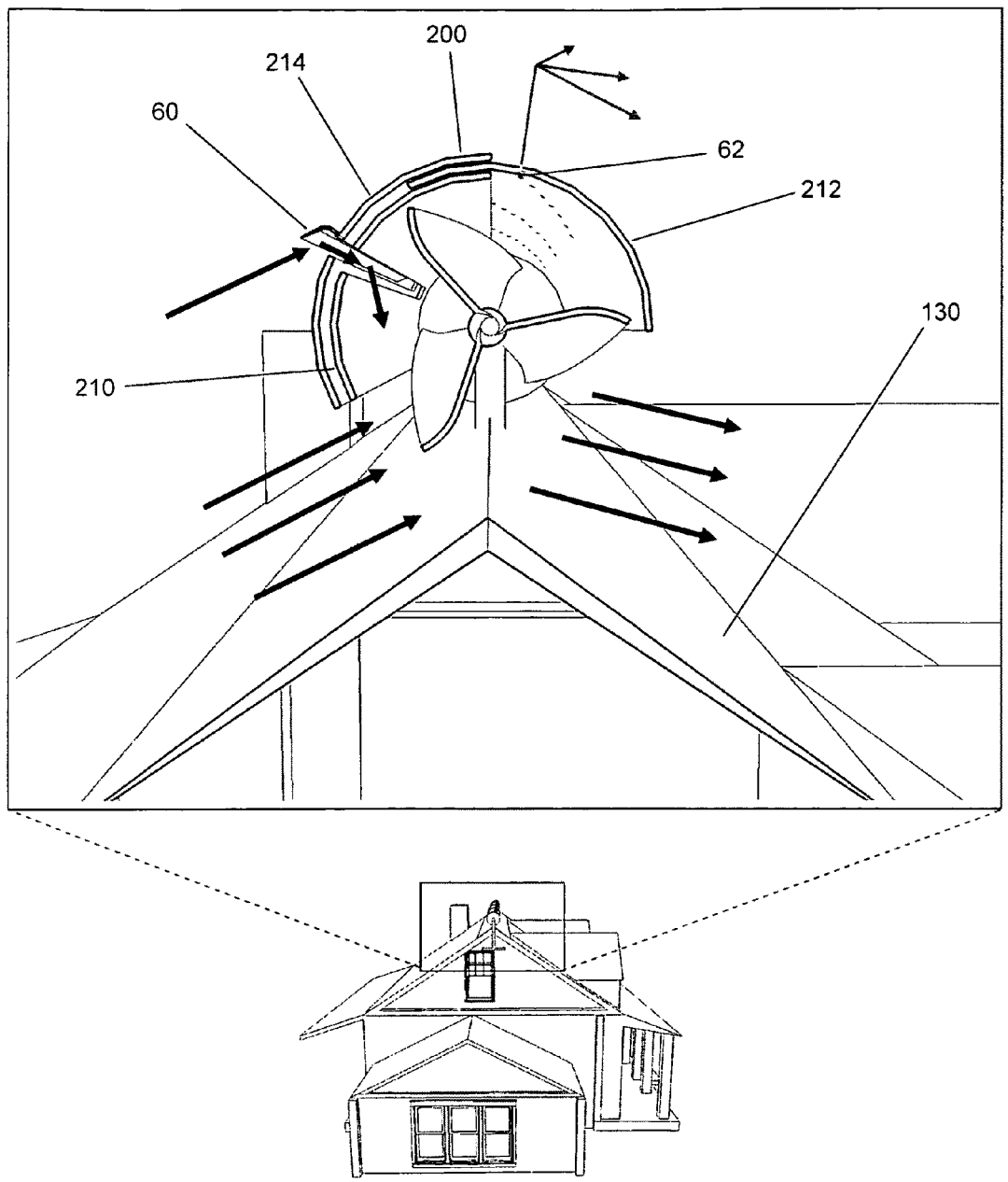
Figure 13:
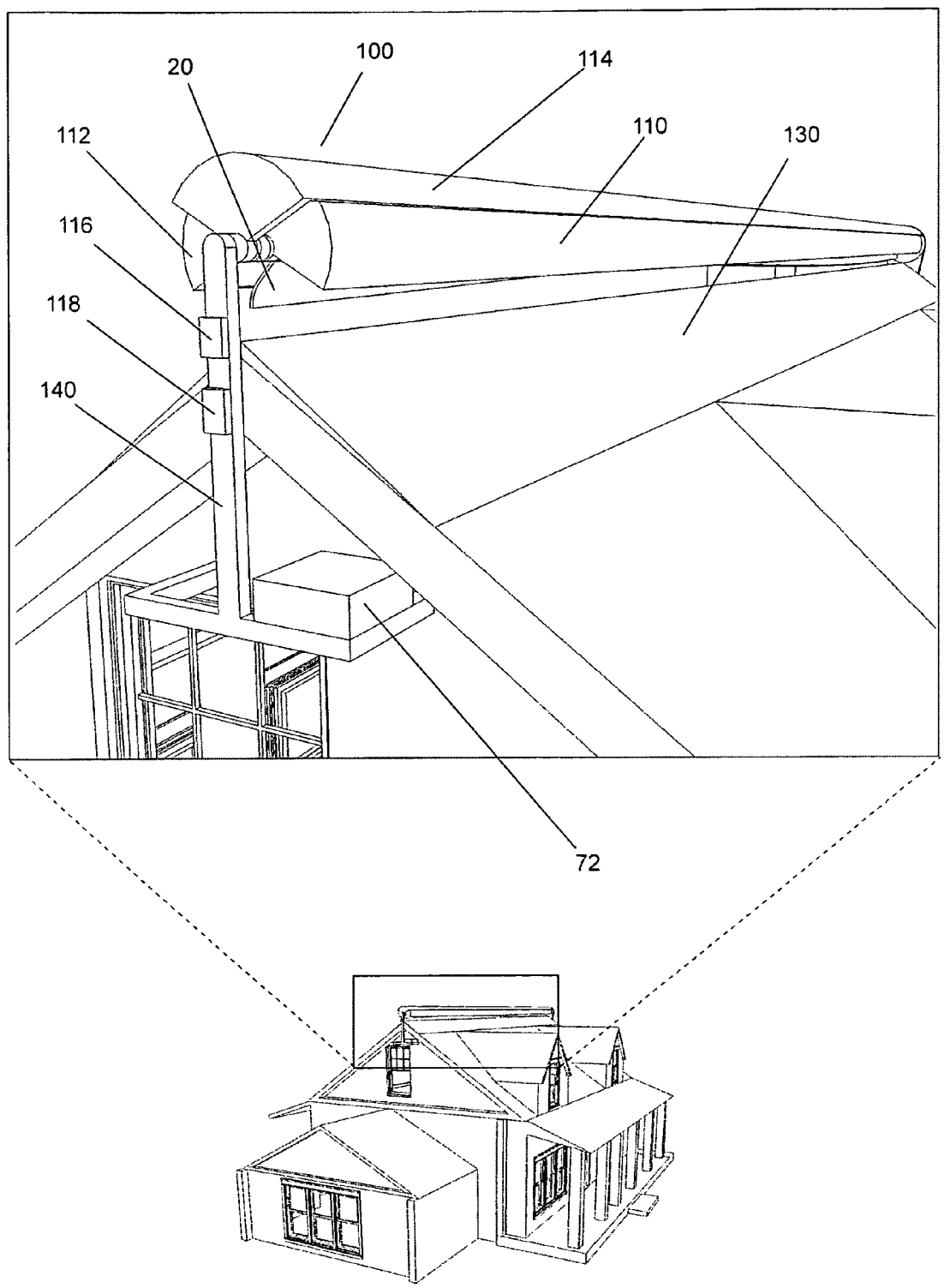
Figure 14:
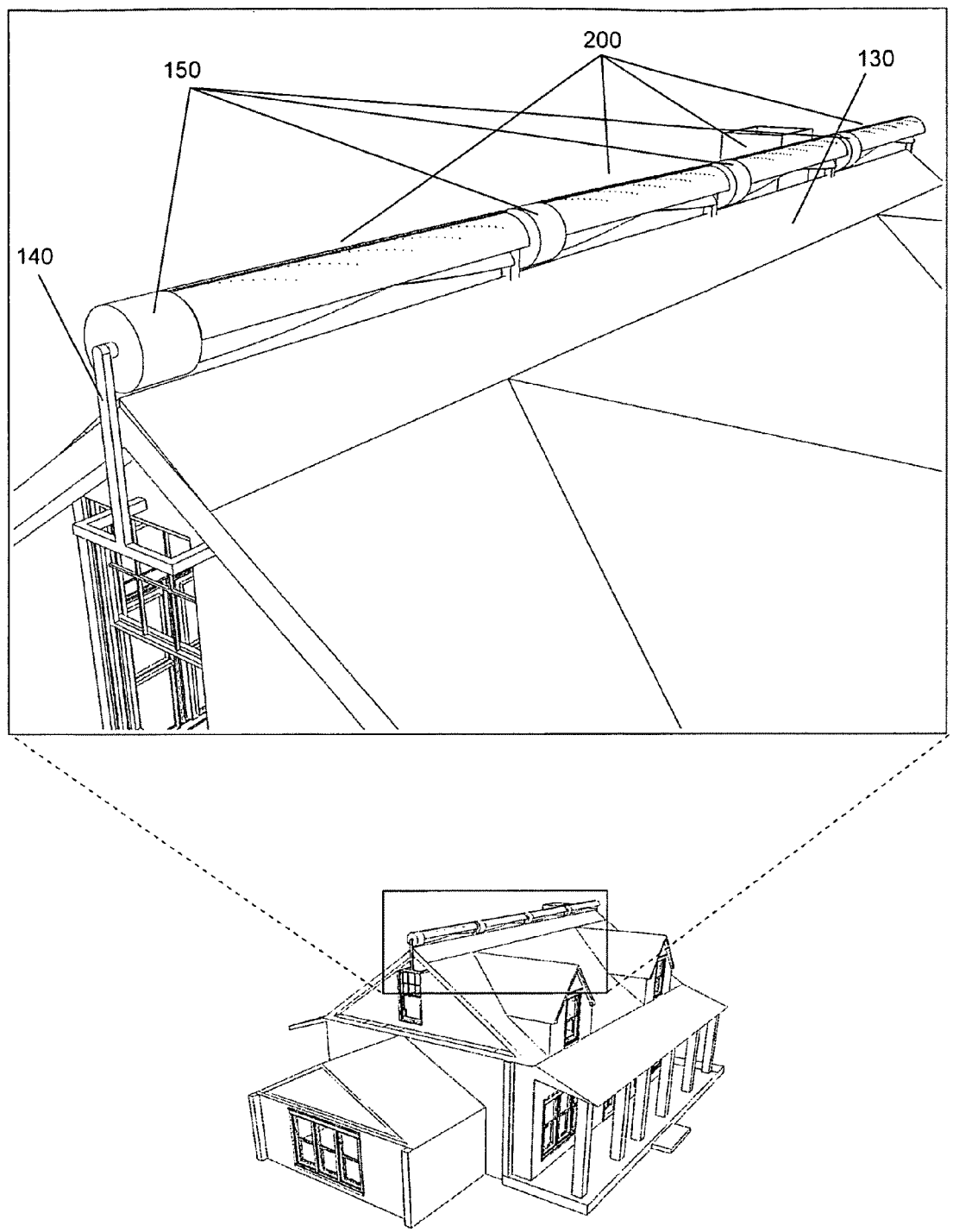
Figure 15:
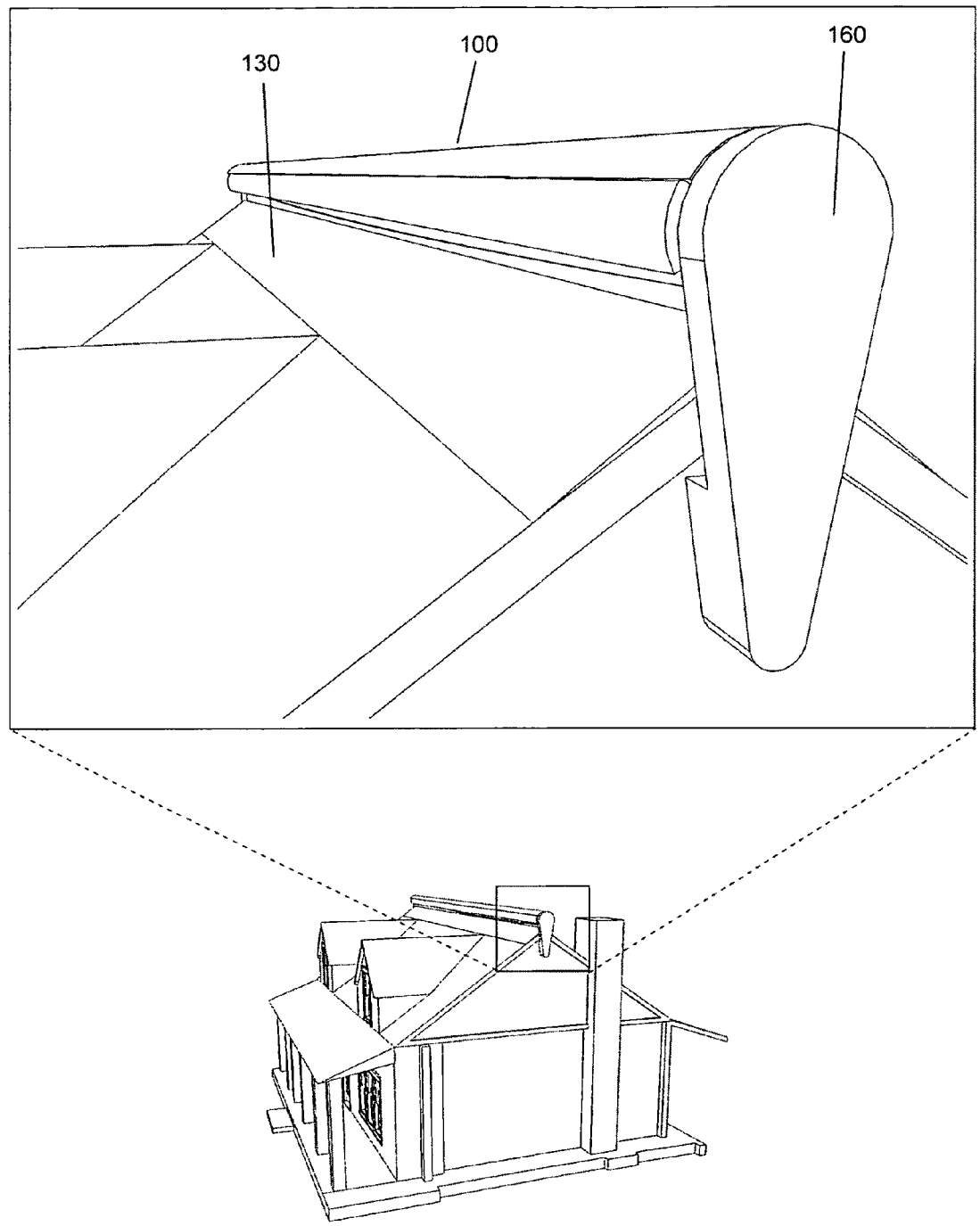
Figure 16:
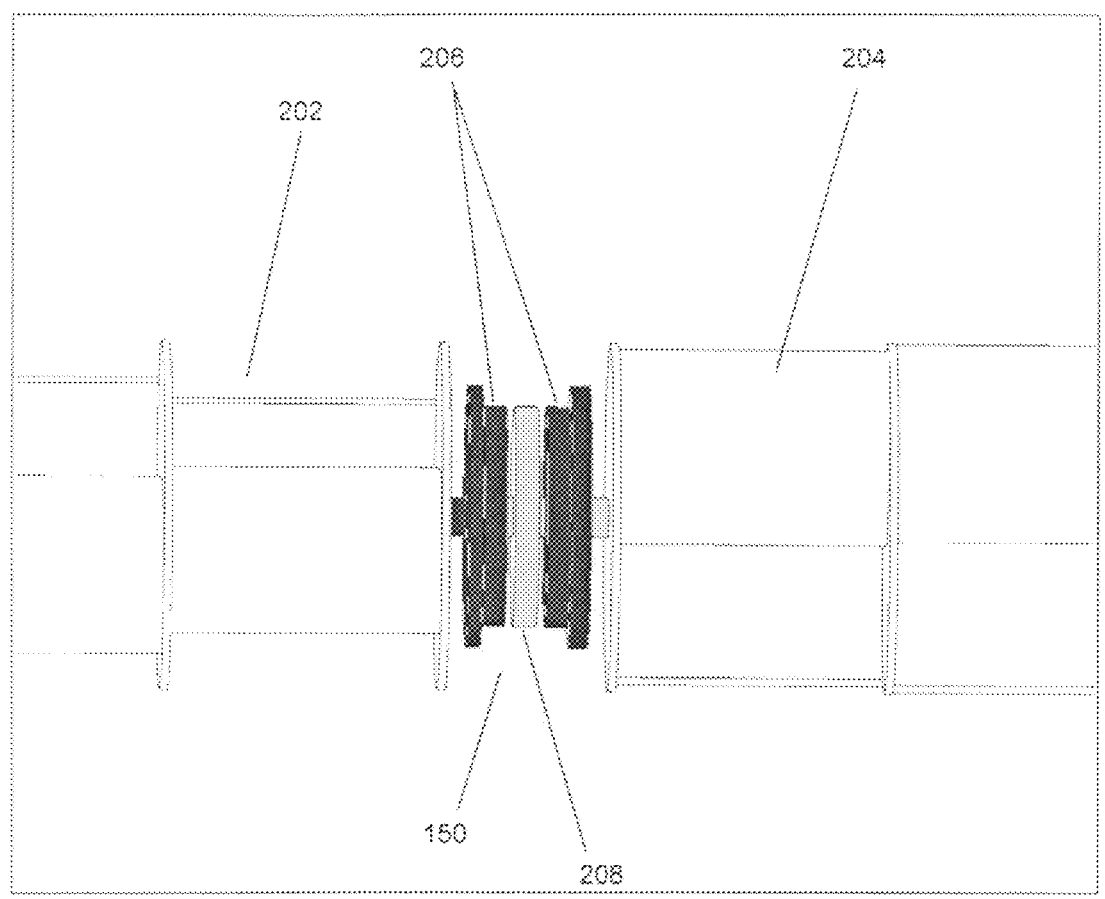

FIG. 5 is a perspective view of a turbine assembly according to a second embodiment of the invention comprising a shroud having four shroud portions, an inlet guide and an outlet guide, showing the shroud portions in a first position. The turbine is preferably installed over the apex of a pitched roof of a structure, the rotor axis being substantially parallel to the apex of the roof, the roof under the turbine assembly is omitted from this figure;

FIG. 6 is a perspective view of the turbine assembly of FIG. 5 showing the shroud portions in a second position;

FIG. 7 is a perspective view of a turbine assembly according to a third embodiment of the invention comprising a shroud having three shroud portions with the shroud portions in a first position overlapping one another. The turbine is preferably installed over the apex of a pitched roof of a structure, the rotor axis being substantially parallel to the apex of the roof, the roof under the turbine assembly is omitted from this figure;

FIG. 8 is a view of the turbine assembly of FIG. 7 with the shroud portions in a second position enclosing the rotor;

FIG. 9 is a perspective cross-sectional view of a turbine assembly according to a fourth embodiment of the invention comprising a shroud having three shroud portions, a flow reversal device, a slot and a plurality of apertures, and showing a flow of air across the rotor. The turbine is preferably installed over the apex of a pitched roof of a structure, the rotor axis being substantially parallel to the apex of the roof, the roof under the turbine assembly is omitted from this figure;

FIG. 10 is a perspective cross-sectional view of the turbine assembly of FIG. 9 showing a flow of air across the rotor in an opposite direction to the flow shown in FIG. 9;

FIG. 11 is a perspective view of a shroud portion having apertures, suitable for forming a shroud of the turbine assembly of FIG. 9;

FIG. 12 is a perspective cross-sectional view of the turbine assembly of FIG. 9 positioned above the apex of the roof of a building showing a flow of air across the rotor;

FIG. 13 is a perspective view of the turbine assembly of FIG. 7 showing the mounting of the turbine assembly to the roof of a building, including sensors and a control device;

FIG. 14 is a perspective view of a roof mounted modular turbine assembly installation comprising several turbine assemblies each with a generator located in-line with the turbine assembly according to the invention;

FIG. 15 is a perspective view of the turbine assembly of FIG. 7, mounted on the apex of the roof of a building and having a generator located in the roof space;

FIG. 16 is a perspective view of a contra-rotating generator located between turbine rotors of an assembly similar to that as shown in FIG. 14, the turbine blades being of segmented Savonius form, the shrouds, supports and generator housing have been removed to show detail.

Figure 17:
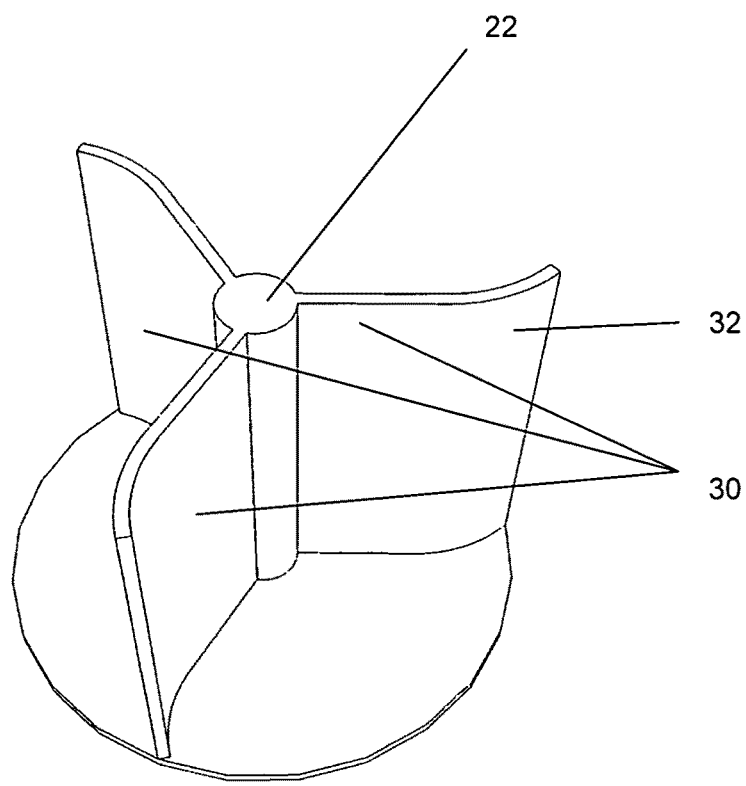
Figure 18:
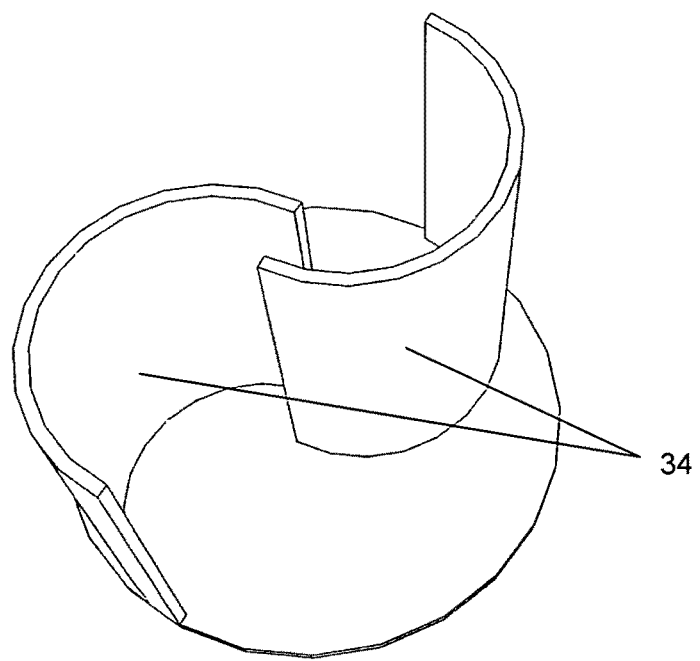
Figure 19:
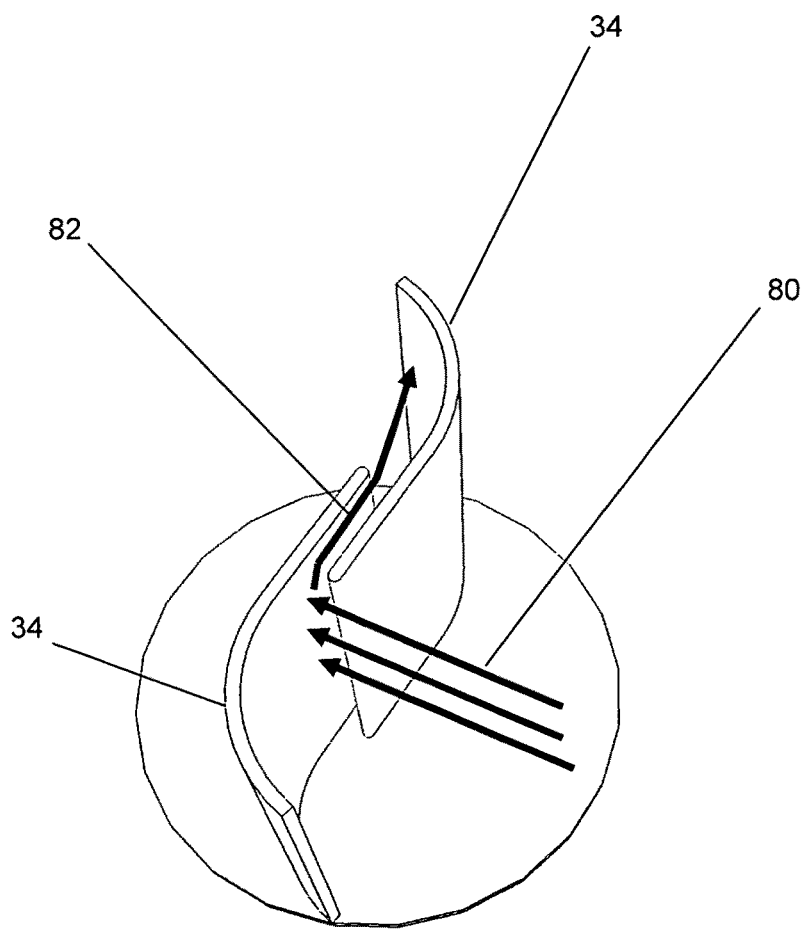
Figure 20:
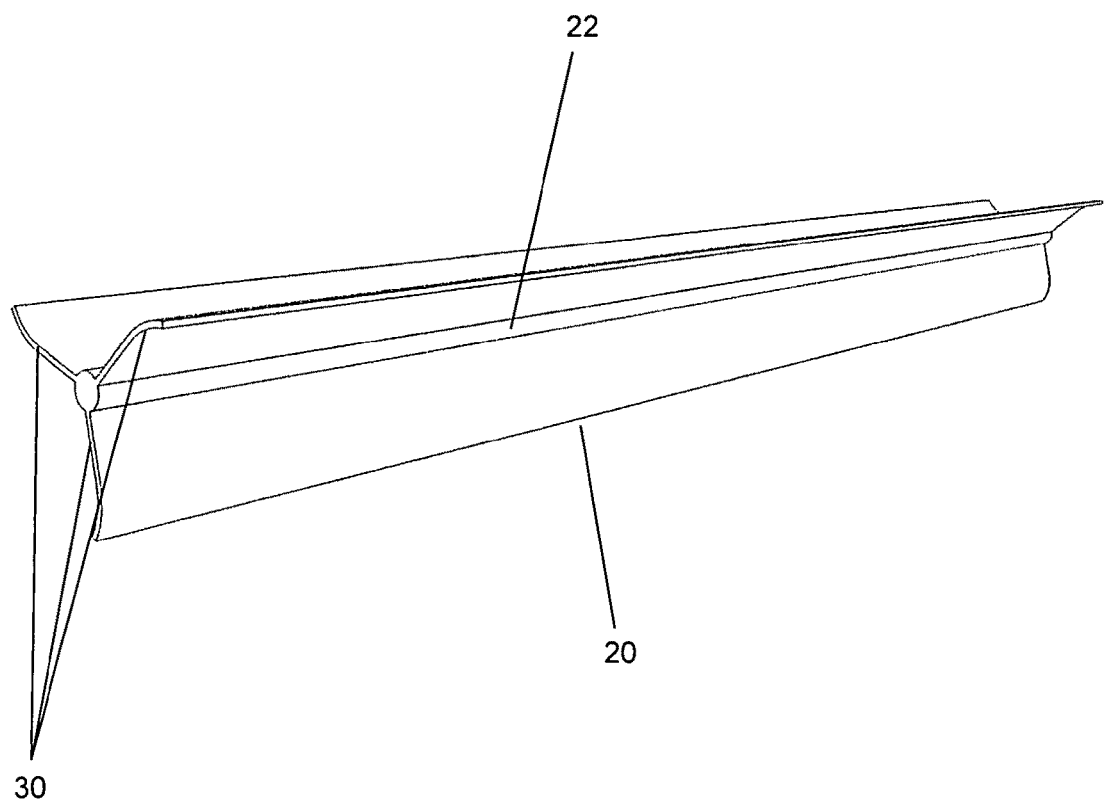
Figure 21:
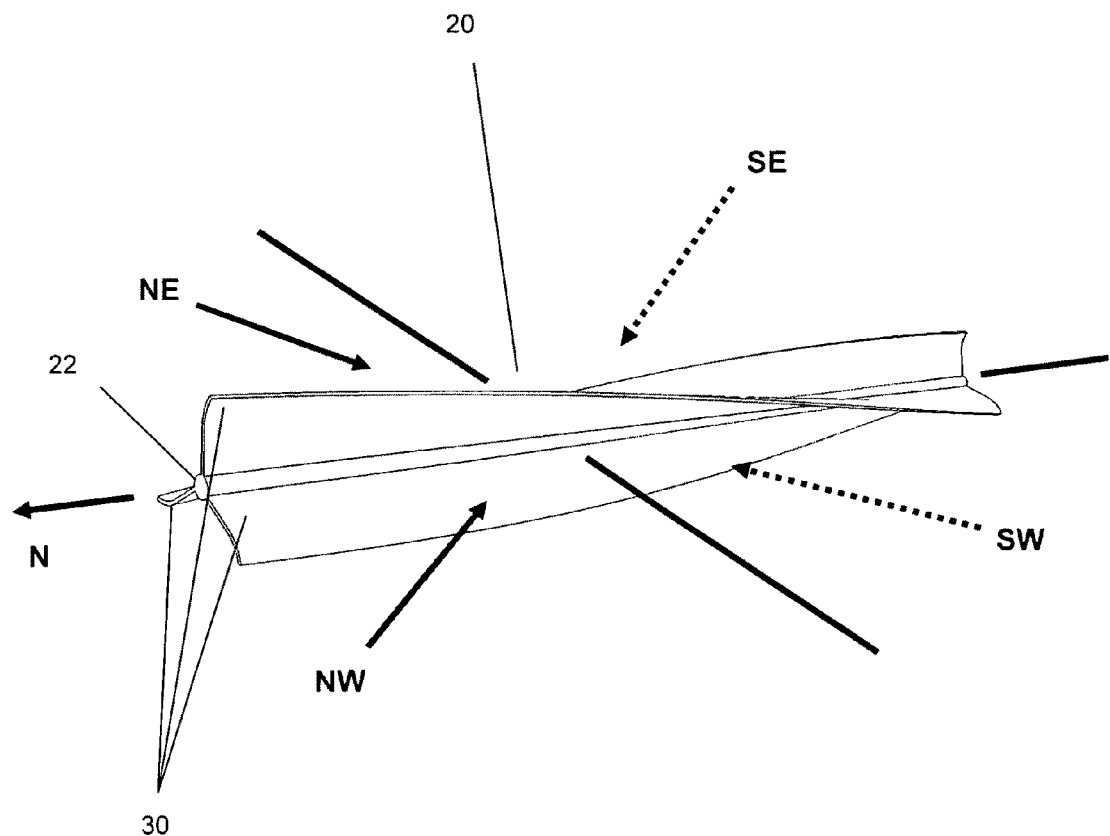
Figure 22:
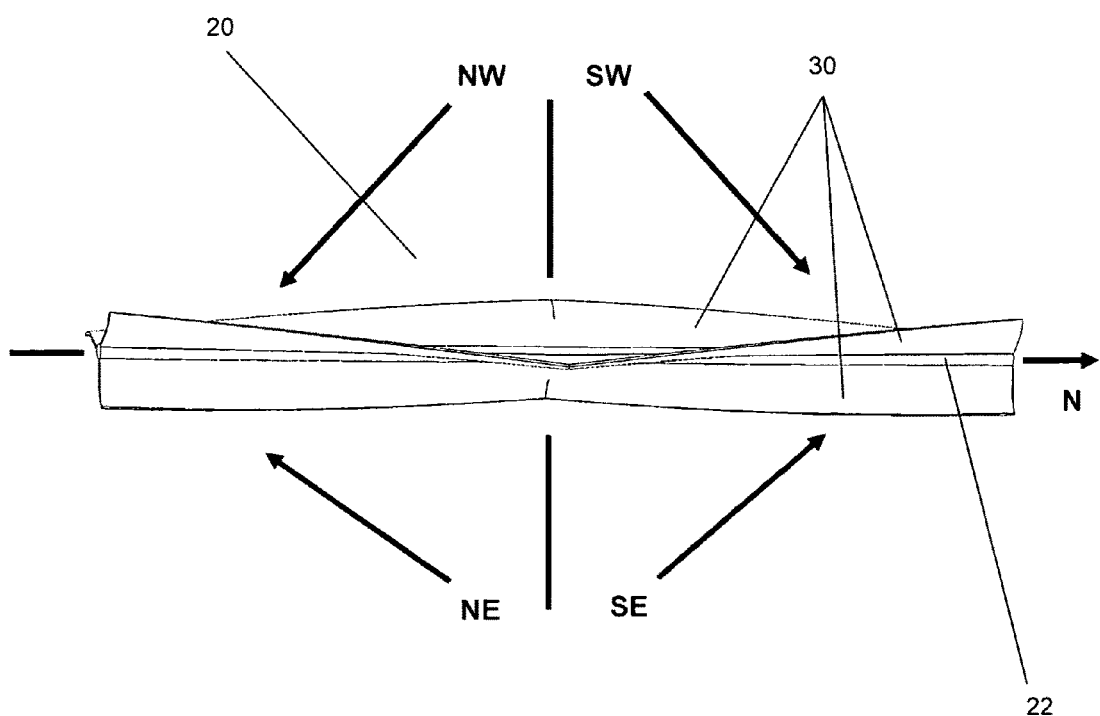
Figure 23:
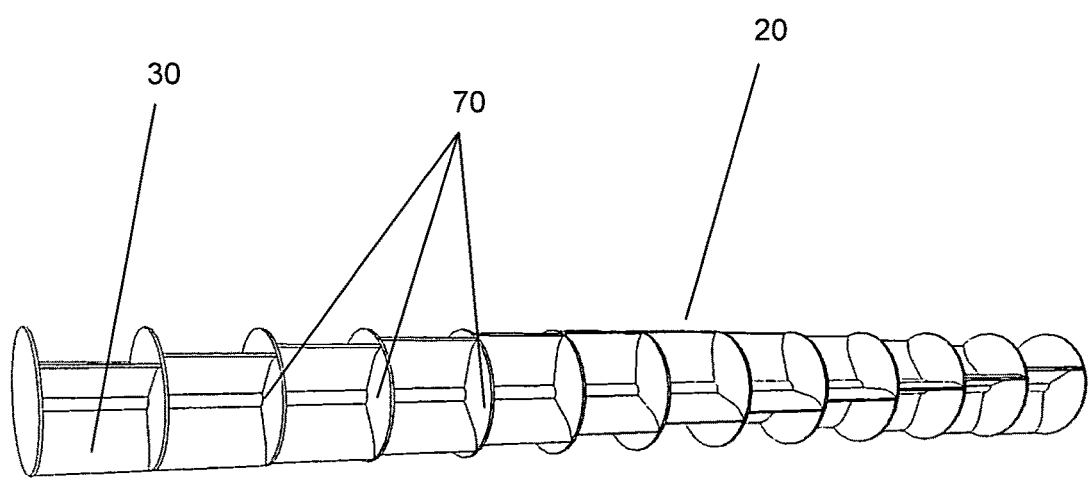
Figure 24:
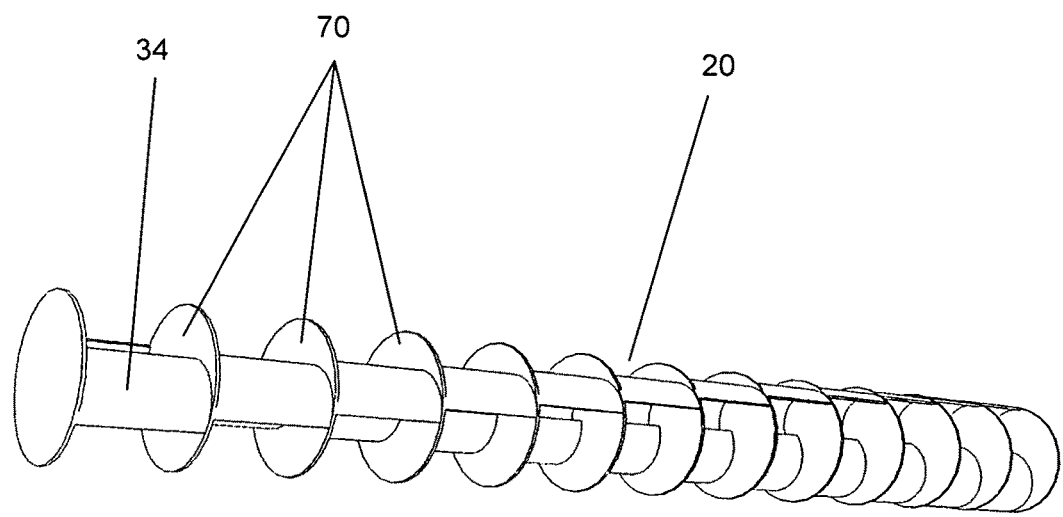
Figure 25:
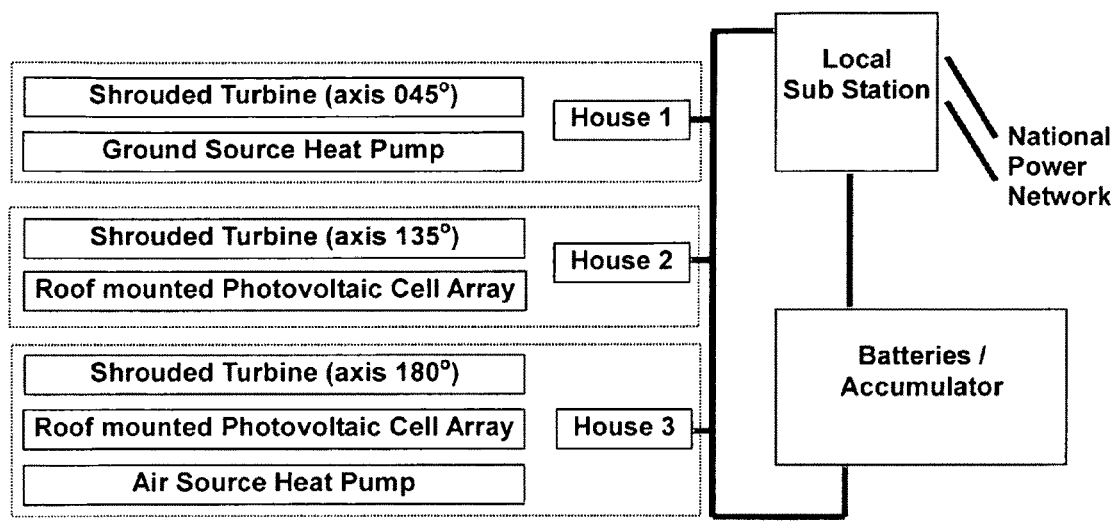

FIG. 17 is a perspective view of a three bladed rotor forming part of a turbine assembly according to the invention;

FIG. 18 is a perspective view of a two bladed Savonius type rotor forming part of a turbine assembly according to the invention;

FIG. 19 is a perspective view of a two bladed Savonius type rotor forming part of a turbine assembly according to the invention, with each rotor having a straight portion and a curved tip portion and showing cross feed air flow;

FIG. 20 is a perspective view of a three bladed rotor forming part of a turbine assembly according to the invention, and having blades parallel to the rotor axis;

FIG. 21 is a perspective view of a three bladed rotor forming part of a turbine assembly according to the invention, having a single spiral rotor and showing air flow directions;

FIG. 22 is a perspective view of a three bladed rotor forming part of a turbine assembly according to the invention, having a double spiral rotor and showing air flow directions;

FIG. 23 is a perspective view of a three bladed segmented rotor forming part of a turbine assembly according to the invention;

FIG. 24 is a perspective view of a segmented Savonius rotor forming part of a turbine assembly according to the invention;

FIG. 25 is a schematic arrangement of a community generating scheme comprising an array of turbine assemblies according to the invention.

Referring to FIGS. 1 to 4, a turbine assembly according to a first embodiment of the invention is designated generally by the reference numeral 10. The turbine assembly 10 comprises a rotor 20 having a plurality of blades 30, a hub 22, and a shroud 40. Each of the blades 30 is attached to the hub 22 and extends axially along the hub 22, forming a helical path along the length of the rotor 20. The outermost edge of each blade 30 forms a helix and the surface of each blade 30 forms a helicoid. In other embodiments, the blades may have a different geometry. The turbine assembly 10 is preferably installed over the apex of a pitched roof of a structure, the rotor axis 94 being substantially parallel to the apex of the roof, the roof under the turbine assembly is omitted from FIGS. 1 to 4.

Figure 1:
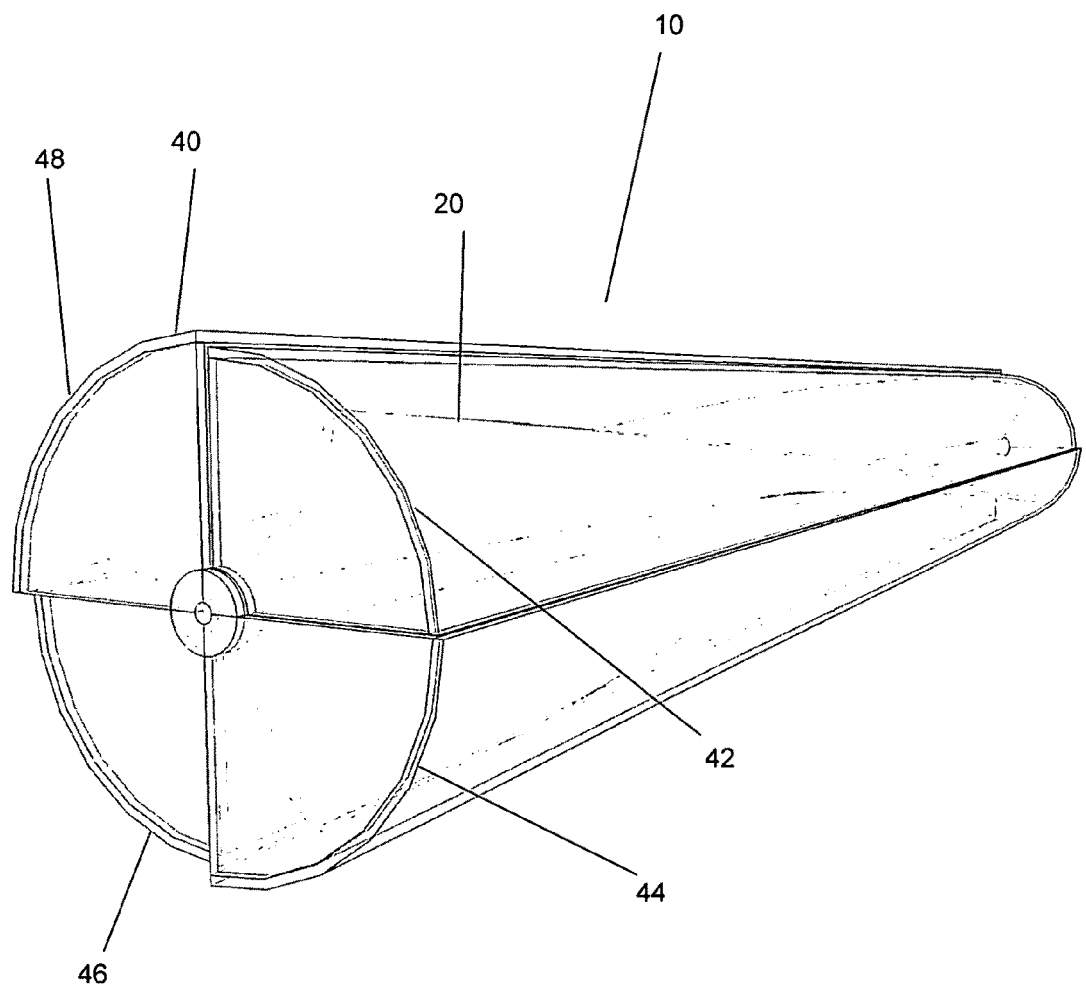

As illustrated in FIG. 1, the shroud 40 is shaped so as to be capable of enclosing the rotor 20, and is rotatable so as to expose a portion of the rotor 20. In other embodiments the shroud 40 may not be capable of fully enclosing the rotor 20.

The shroud 40 comprises four shroud portions 42, 44, 46, 48. In other embodiments of the invention, the shroud 40 may comprise a different number of shroud portions.

In this embodiment, movement of the shroud 40 is controlled by a controller or control device 72 in order to optimise the position of the shroud 40 depending upon the current wind speed and direction. The controller may take the form of an external controller, such as a computerised control system. Alternatively, the controller may take the form of a mechanism which utilises the aerodynamic forces acting on the rotor blades 30 and/or the shroud 40.

The movement of the shroud 40 may also be controlled manually by an operator.

Each shroud portion 42, 44, 46, 48 is formed so as to be substantially arc shaped in cross section, extending axially along the rotor 20 and circumferentially around a portion of the rotor blades 30. Each shroud portion 42, 44, 46, 48 includes, at each end, a substantially sector shaped end plate. In other embodiments the end plates may be circular or any other shape and they may include a counter balance.

Each of the shroud portions 42, 44, 46, 48 is separately rotatable. However in other embodiments two or more shrouds may rotate together either in the same direction or in opposite directions, either by the same amount or a differential amount for example by using gears.

Figure 2:
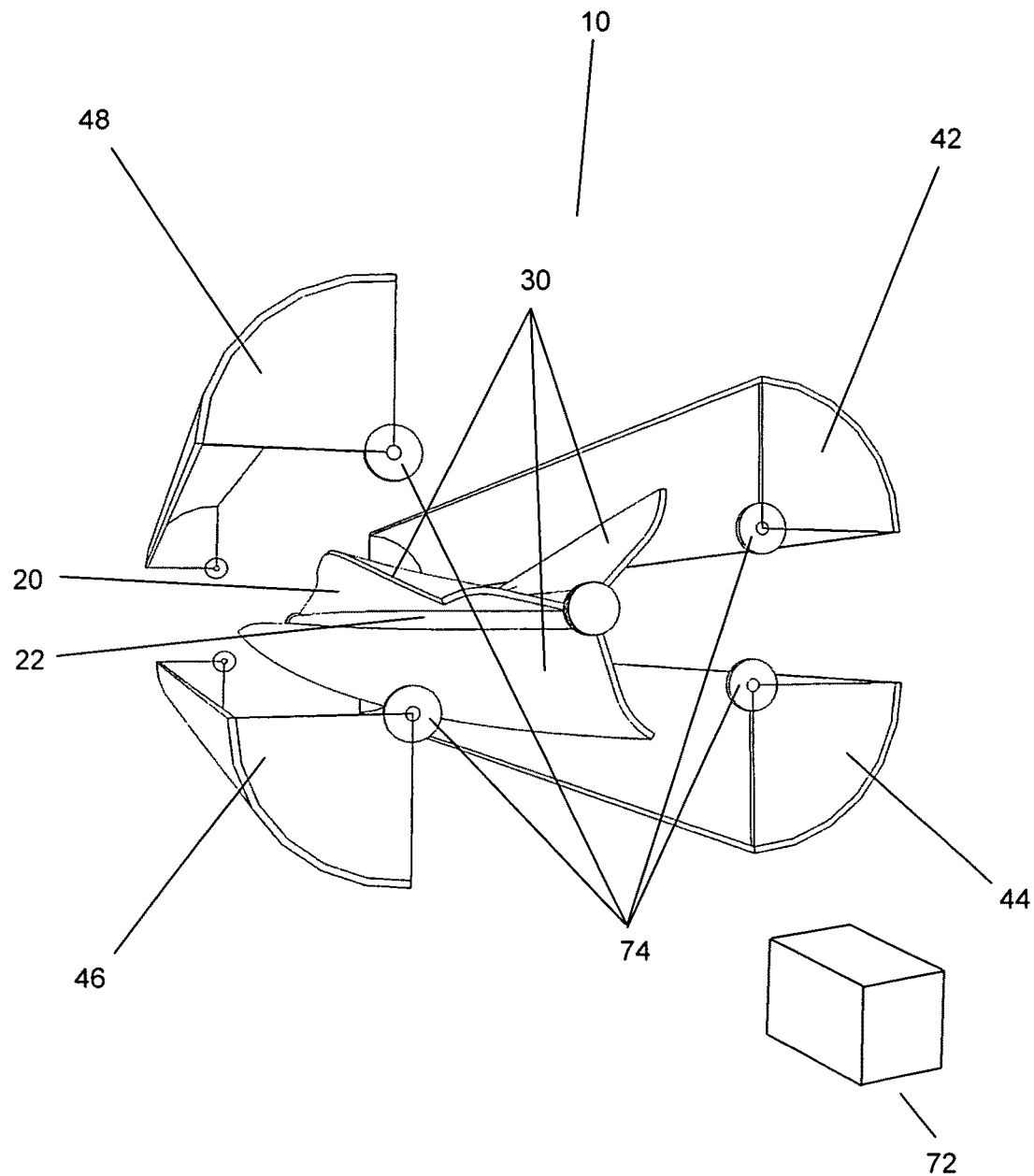

FIG. 2.1 is an exploded view of the turbine assembly of FIG. 1, illustrating the axis of rotation 94 of the rotor 20 and the axis of rotation 92 of one of the shroud portions 48, for simplicity the axis of rotation of the other shroud portions have been omitted. In this embodiment the axis of rotation 92 of each of the shroud portions 42, 44, 46, 48 is coaxial with the axis of rotation 94 of the rotor 20.

In other embodiments it is envisaged that the shroud portions 42, 44, 46, 48 may have an axis of rotation 92 which is offset from the axis of rotation 94 of the rotor 20, for example by using a separate pivot point to achieve the required offset.

In other embodiments the axis of rotation 92 of one or more of the shroud portions 42, 44, 46, 48 may vary as the shroud portion 42, 44, 46, 48 rotates, for example by the use of slotted guides or cams. This allows further optimisation of blade tip clearances and turbine shrouding.

In this embodiment, the shroud portions 42, 44, 46, 48 are arranged as a first pair of shroud portions 42, 46 and a second pair of shroud portions 44, 48. Each shroud portion of a respective pair has substantially the same spacing from the axis of rotation 94 of the rotor 20 as the other shroud portion of that pair. The first pair of shroud portions 42, 46 has a different spacing from the axis of rotation 94 of the rotor 20 than that of the second pair of shroud portions 44, 48.

In addition the length of each of the first pair of shroud portions 42, 46 along the axis of rotation 94 of the rotor, is different from the length of each of the second pair of shroud portions 44, 48 along the axis of rotation 94 of the rotor. This allows each of the first pair of shroud portions 42, 46 to be able to rotate past each of the second pair of shroud portion 44, 48, as shown in FIGS. 3 and 4.

The distance by which each shroud portion 42, 44, 46, 48 is spaced apart 96, transversely from its axis of rotation 92 is constant. However, in other embodiments of the invention this distance 96 may vary with the angular position of the shroud portion 42, 44, 46, 48, relative to the axis of rotation 92 of the shroud portion 42, 44, 46, 48. Furthermore the distance by which each shroud portion 42, 44, 46, 48 is spaced apart 96, 97, 98, transversely from its axis of rotation 92 may be different at either edge of the shroud portion (assuming an edge lies parallel to the axis of rotation 92 of the shroud portion)

One or more actuators 74 may be provided to vary the position of each of the shroud portions 42, 44, 46, 48 in response to signals from the controller 72. Each shroud portion 42, 44, 46, 48 is driven by a separate actuator 74. However, in other embodiments of the invention a single actuator 74 may drive more than one shroud portion 42, 44, 46, 48, or alternatively, more than one actuator 74 may drive one shroud portion 42, 44, 46, 48.

Figure 3:
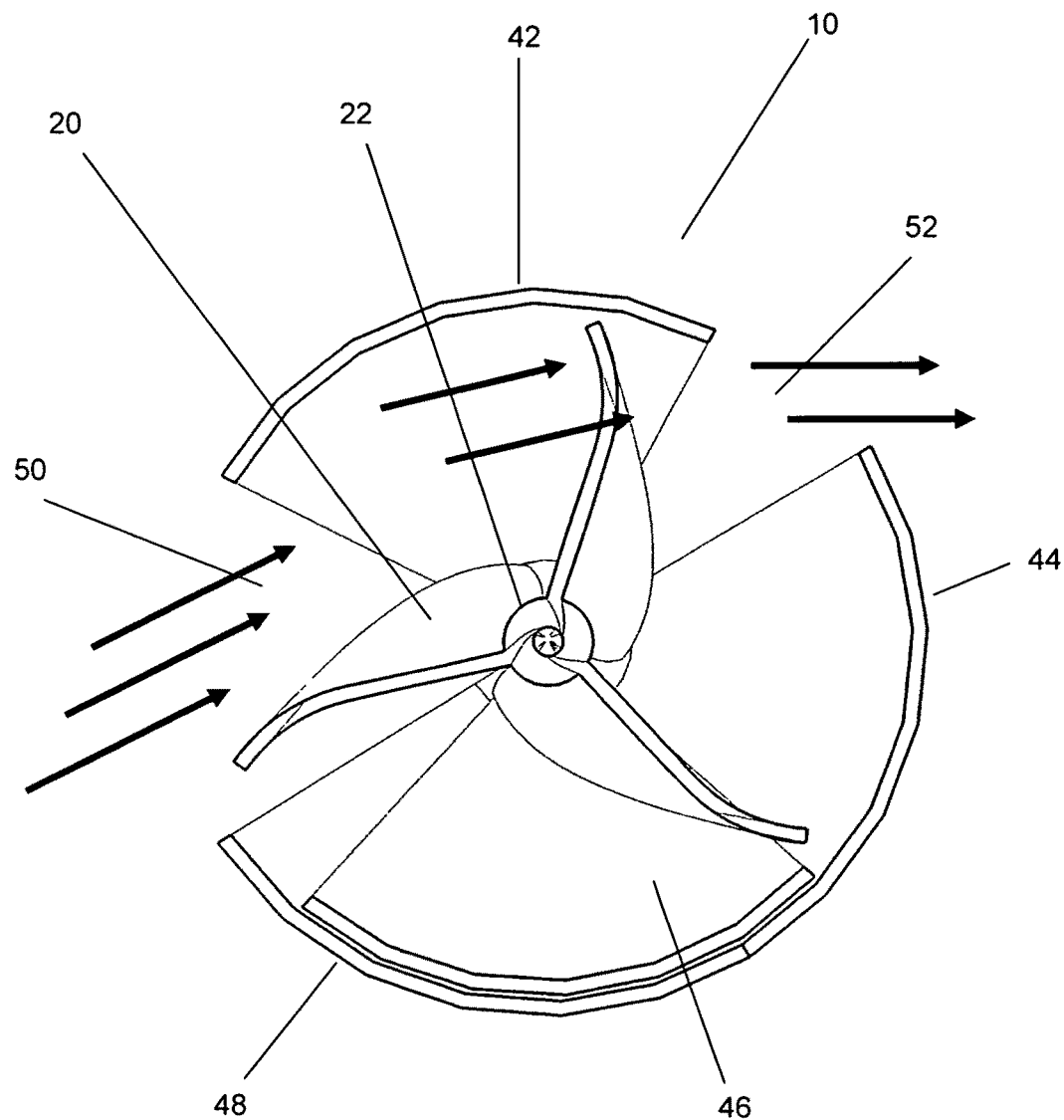
FIG. 3 is a cross sectional view of the turbine assembly of FIG. 1 showing the shroud portions in a second position defining a first inlet and a first outlet.
Figure 4:
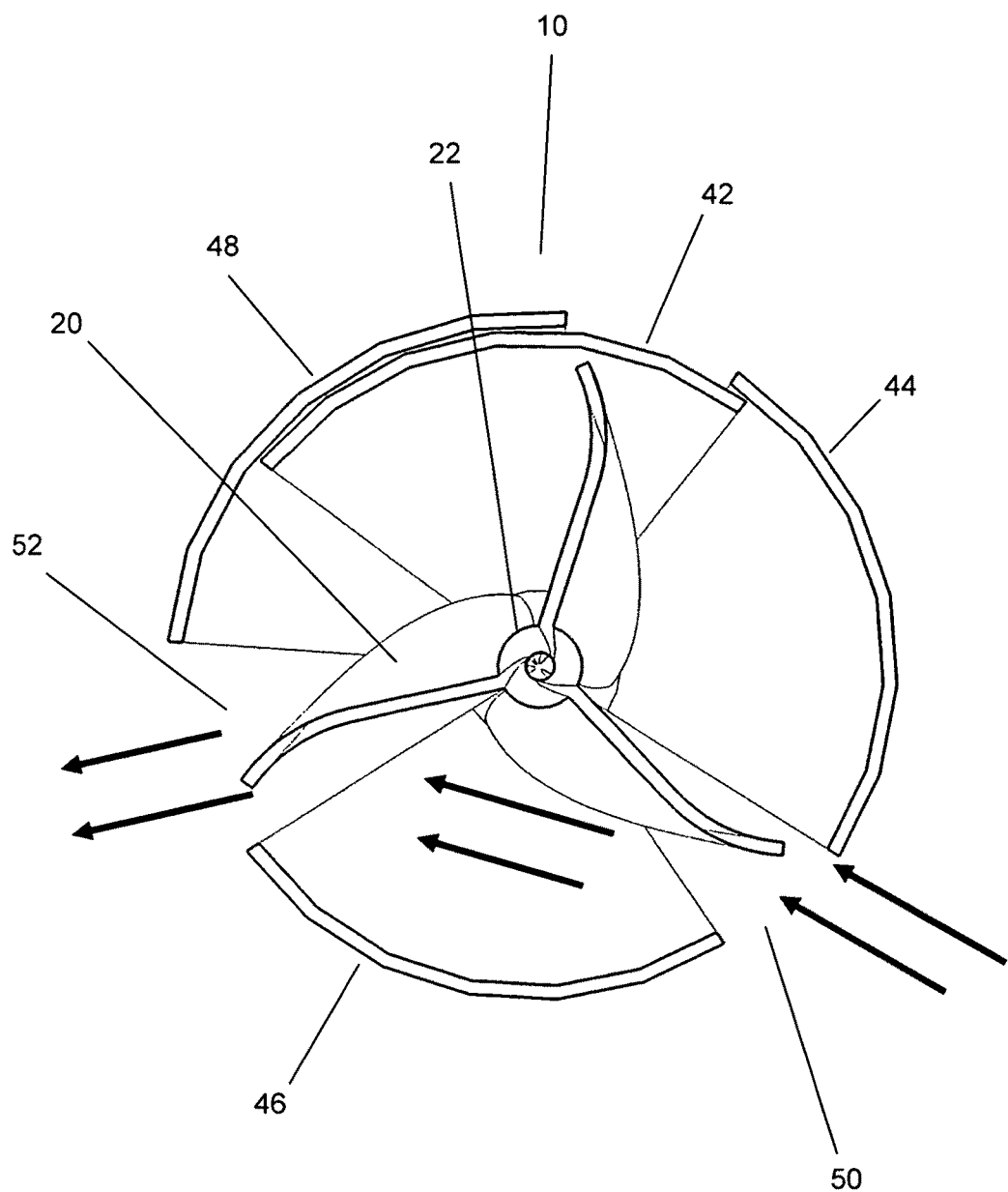
FIG. 4 is a cross sectional view of the turbine assembly of FIG. 1 showing the shroud portions in a third position defining a second inlet and a second outlet.

In operation, as shown in FIG. 3, the shroud portions 42, 44, 46, 48 are rotated so as to create an inlet 50 and an outlet 52 through which an air flow can pass. Since the shroud 40 comprises a plurality of shroud portions 42, 44, 46, 48, it is possible to position an inlet and outlet appropriately depending upon the wind speed and direction. In FIG. 3, the air flow passes over the rotor hub 22. The turbine assembly 10 is preferably installed over the apex of a pitched roof of a structure, the rotor axis 94 being substantially parallel to the apex of the roof, the roof under the turbine assembly is omitted from this figure. The use of two or more shroud portions allows inlet 50 and outlet 52 areas to be independently or dependently variable in angular position and area whereby the inlet 50 varies at a differing or variable amount to the outlet 52. The direction of movement and area change of the inlet 50 may be in the same sense or the opposite sense to the outlet 52. A feature of the invention is that regardless of whether the inlet 50 and outlet 52 areas vary dependently or independently, adjustment of the inlet 50 area or position does not result in the same magnitude of adjustment in area or position of the outlet 52 in either the same or inverse sense.

The shroud portions 42, 44, 46, 48 also perform the important function of covering the dead sector of the rotor 20, i.e. that part of the rotor 20 in which the blades 30 are moving in an opposite direction to the air flow. By covering the dead sector, the shroud portions 42, 44, 46, 48 effectively prevent this portion of the rotor 20 from detracting from the energy extracted from the wind by the turbine assembly 10.

When the air flow changes direction to come from substantially the opposite direction, from the other side of the turbine assembly or in the case of the roof apex installation, the other side of the roof, the inlet 50 and outlet 52 defined by the position of the shroud portions 42, 44, 46, 48 may be interchanged or any other adjustment made so as to direct airflows from the new direction. This reconfiguration enables the rotor 20 to continue to be driven by the air flow. FIG. 4 shows a turbine assembly 10 with the air flow in a substantially opposite direction to that shown in FIG. 3.

Under these conditions, the shroud portions 42, 44, 46, 48 have again been arranged to block the dead sector of the rotor from the oncoming air flow and also to provide an inlet 50 and an outlet 52. In FIG. 4, the air flow passes under the rotor hub 22.

As shown in FIGS. 3 and 4, the inlet 50 and the outlet 52 can differ in size and position depending upon the direction of the air flow. The size of the inlet 50 and the outlet 52 may also be altered in response to changes in wind speed, for example to restrict air flow when the air speed increases.

Turning now to FIGS. 5 and 6, a turbine assembly according to a second embodiment of the invention is designated generally by the reference numeral 90. Parts of the turbine assembly 90 that correspond to parts of turbine assembly 10 have been given corresponding reference numerals for ease of reference. The turbine assembly 90 is preferably installed over the apex of a pitched roof of a structure, the rotor axis 94 being substantially parallel to the apex of the roof, the roof under the turbine assembly is omitted from FIGS. 5 and 6.

The turbine assembly 90 comprises a shroud 40 comprising four shroud portions 42, 44, 46, 48. Shroud portion 44 includes an inlet guide 56. In this embodiment the inlet guide only functions when the air flow passes under the rotor axis 94, as shown in FIG. 5.

The inlet guide 56 functions to turn the inlet air flow in the plane of the rotor's rotational axis 94 so that the flow impinges upon the face of the blade 30 at the optimum angle in the region immediately inside of the inlet 50.

A further function of the inlet guide 56 is to collect air flows from a greater catchment area than that of the inlet alone, and to accelerate the air flow onto the rotor 20 by reducing the cross sectional area through which the air flow passes.

The inlet guide 56 comprises a folded lip at the leading edge of shroud portion 44. In alternative embodiments, the inlet guide 56 may comprise a separate part which is either attached to the leading edge of a shroud portion, or is entirely separate from the shroud portion.

Shroud portion 48, comprises an exhaust guide 58. In this embodiment the exhaust guide 58 operates to modify air flows only when the air flows under the rotor axis 94, as shown in FIG. 5.

The exhaust guide 58 reduces the exhaust drag by, for example, lowering the pressure immediately downstream of the exhaust 52.

The exhaust guide 58 comprises a folded lip at the trailing edge of shroud portion 48. In alternative embodiments, the exhaust guide 58 may comprise a separate part which is either attached to the trailing edge of a shroud portion, or is entirely separate from the shroud portion.

Although the inlet guide 56 and the exhaust guide 58 have been described as forming part of shroud portions 44, 48 respectively, they could form part of any shroud portion. In an alternate embodiment, the inlet guide 56 and exhaust guide 58 may be configured so as they function when the air flows over the rotor axis 94.

Referring to FIGS. 7 and 8, a turbine assembly according to a third embodiment of the invention is designated generally by the reference numeral 100. Features of turbine assembly 100 which correspond to those of the turbine assemblies 10, 90 have been given corresponding reference numerals for ease of reference. The turbine assembly 100 is preferably installed over the apex of a pitched roof of a structure, the rotor axis 94 being substantially parallel to the apex of the roof, the roof under the turbine assembly is omitted from FIGS. 7 and 8.

The turbine assembly 100 comprises a shroud 40 comprising three shroud portions 110, 112, 114. Other embodiments may feature only two shroud portions, or any other number of shroud sections.

The shroud portions 110, 112, 114 are each spaced apart from the axis of rotation 94 of the rotor 20 by a different distance to that of each other shroud portion 110, 112, 114. In addition, the axial length of each of the shroud portions 110, 112, 144 is different from the axial length of each other shroud portion 110, 112, 114. These features allow each shroud portion 110, 112, 114 to be able to rotate past each other shroud portion 110, 112, 114, as shown in FIG. 7. Each shroud portion 110, 112, 114 extends axially along the length of the rotor 20 and includes, at each end, an end plate.

Referring to FIGS. 9 to 12, a turbine assembly according to a fourth embodiment of the invention is designated generally by the reference numeral 200. Features of the turbine assembly 200 which correspond to those of turbine assemblies 10, 90, 100 have been given corresponding reference numerals for ease of reference. The turbine assembly 200 is preferably installed over the apex of a pitched roof of a structure, the rotor axis 94 being substantially parallel to the apex of the roof, the roof under the turbine assembly is omitted from FIGS. 9 to 11.

The turbine assembly 200 comprises a shroud 40 comprising three shroud portions 210, 212, 214. Each shroud portion 210, 212, 214 extends axially along the length of the rotor 20 and includes, at each end, an end plate. Other embodiments may feature only two shroud portions, or any other number of shroud portions.

FIGS. 9, 10, 12, illustrate that shroud portions 210, 212, 214 may be positioned to define an open sector of the exposed rotor 120, rather than a separate inlet 50 and outlet 52. An open sector 120 is a portion of the rotor across or through which the air flows. The open sector is under the rotor in FIGS. 9 and 12 and over the rotor in FIG. 10.

The use of two or more shroud portions allows the extent of the open sector 120 to be varied by varying the upstream edge of the open sector 120, the downstream edge of the open sector 120, or both upstream and downstream edges dependently or independently whereby the upstream edge varies at a differing or variable amount to the downstream edge. The direction of movement of the upstream edge may be in the same sense or the opposite sense to the downstream edge. A feature of the invention is that regardless of whether the upstream and downstream edges vary dependently or independently, adjustment of the upstream edge position does not result in the same magnitude of adjustment in position of the downstream edge in either the same or inverse sense.

Shroud portion 214 comprises a flow reversal device 60. The flow reversal device 60 comprises a slot extending along the length of the shroud portion 214 having a curved guide located on its downstream edge. The flow reversal device 60 operates in conjunction with a slot 61 extending axially along the length of the shroud portion 210, which is the innermost shroud portion. In other embodiments the flow reversal device 60 may be located at the upstream edge of the shroud portion, in this arrangement the slot extending along the length of the shroud and located immediately upstream of the flow reversal device 60 would not be required.

The flow reversal device 60 channels air, which would otherwise not enter the inlet 50 or open sector 120 to the turbine assembly 200, through the shroud portion 214 and directs it onto the blades 30 within the dead sector of the rotor 20 via slot 61. In this way the flow reversal device 60 reduces the angular extent of the dead sector of the turbine assembly 200. In other embodiments the flow reversal device 60 may also increase the mass flow through the rotor 20.

In other embodiments, the flow reversal device 60 may take the form of a separate part attached to one or more of the shroud portions 210, 212, 214. Alternatively, the flow reversal device may be integrally formed with a shroud portion 210, 212, 214.

In other embodiments where the innermost shroud portion 210 is either not present or in a different position, the slot 61 would not be required.

Shroud portion 212 comprises a plurality of apertures 62 illustrated particularly in FIG. 11. As the air flow accelerates over the turbine assembly 200, the air pressures immediately above, and in the lee of the turbine assembly 200 are reduced. The plurality of apertures 62 allows this drop in static pressure to draw air through the apertures 62, and out of the dead sector of the turbine assembly 200. This reduces the pressure within the dead sector and the drag on the dead sector of the rotor 20 which increases the efficiency of the turbine assembly 200. In other embodiments any one or more of the shroud portions 210, 212, 214 may include apertures 62.

The combination of the flow reversal device 60 and the apertures 62, allows a more efficient transfer of energy from the fluid to the rotor 20 when the flow is directed under the rotor axis 94 as can be seen in FIGS. 9 and 12.

Whilst the turbine assembly 200 shown in FIG. 9 is optimised for operation in air flows which are directed under the rotor axis 94, (indicated by the arrows in FIGS. 9 and 12), it can also operate when the air flow is in the reverse direction. FIG. 10 shows the turbine assembly 200 with the shroud portions 210, 212, 214 positioned to enable operation when the air flow is directed over the rotor axis 94. In this mode of operation the flow reversal device 60, the slot 61 and the apertures 62 are not operative. In other embodiments the flow reversal device 60, the slot 61 and apertures 62 may be used to improve operating efficiency of the turbine assembly for air flows which are directed over the rotor axis 94.

A turbine assembly according to the first aspect of the invention may be mounted on the apex of the roof of a building or other structure.

FIG. 12 shows turbine assembly 200 mounted on the apex of a pitched roof.

An advantage of mounting a turbine assembly according to a first aspect of the invention on the apex of a pitched roof is that it is possible to capitalise on the increase in air speed as air flows up and over the roof.

Referring to FIG. 13, a turbine assembly 100 is shown mounted over the apex of the roof of a building. The roof includes a cap 130 over its apex.

The cap 130 may be arranged to ensure the optimal clearance between the apex of the roof and the bottom of the turbine assembly 100. This can be important if the apex of the roof is not straight and/or has a particularly rough surface finish.

The profile of the cap 130 may also be shaped to optimise the angle of the incoming air flow entering the turbine assembly 100. The profile of the cap may be further shaped to modify the flow characteristics of air flow upstream of turbine inlet 50 or open sector 120. In other embodiments the profile of the cap may be variable.

In installations where a turbine assembly is to be retrofitted to an existing building, it may also be necessary for the cap 130 to provide the supporting structure for the turbine assembly.

For short to medium length roof spans, the turbine assembly may be supported by brackets 140 secured to the gable ends of the building, as shown in FIG. 13. Alternatively, the brackets 140 may extend to ground level. Both of these supporting arrangements have the advantage that the roof structure remains unaltered.

Alternatively, for longer roof spans it will be necessary to support the turbine assembly at points along the span. This technique lends itself to a modular installation in which a number of turbine assemblies are mounted in series. Supporting points along the span of the roof can be attached to the cap 130 or alternatively may extend through the roof to attach to the structure of the building.

FIG. 13 also illustrates a vibration sensor 116, a plurality of sensors 118 and a controller or control device 72, these features may be applied in any combination to the turbine assembly 10, 90, 100, 200. A preferable method of adjustment of the shroud portions being determined by a control device 72 and moved by an actuator 74, the rotor being connected to an electrical generator; the method comprising the steps of: adjusting the position of the shroud portions;

determining the electrical power output from the electrical generator; and repeating the above steps in order to achieve peak electrical power output from the electrical generator.

More preferably, the turbine assembly 10, 90, 100, 200, further comprising a plurality of sensors 118, each sensor being adapted to sense a variable which includes but is not limited to wind speed; wind direction; temperature; humidity; vibration; and pressure, the method comprises the additional initial steps of:

receiving an input from one or more of the plurality of sensors 118;

comparing the input to a predetermined value; and using the results from the comparison step to determine the required adjustment to the position of the shroud.

The input which is received from the one or more sensors 118 may be compared to either a preset value, or a previously measured value from one or more of the sensors 118, or a value determined from a "look-up'" table. Alternatively, the input received from the one or more sensors may be compared to an other predetermined value.

The turbine assembly 10, 90, 100, 200 may optionally be fitted with a vibration sensor 116 to measure vibration levels during operation of the turbine assembly 10, 90, 100, 200. Data collected from such a sensor 116 can be used to determine the operating efficiency of the turbine assembly 10, 90, 100, 200 and to detect fault conditions. This information can also be used to plan maintenance activities for the turbine assembly 10, 90, 100, 200 and its associated components.

FIG. 14 shows several turbine assemblies 200 according to the fourth embodiment of the invention connected together in a single installation on the apex of a roof.

In installations where the pitch of the roof is steeper, the turbine assembly may be positioned to one side of the apex of the roof to enable the apex to form a pseudo flow guide. In this arrangement, when the turbine assembly is in the leeward side of the apex of the roof the air flows over the top of the rotor 20 and when the turbine is on the windward side of the apex the air flows under the rotor 20.

When considering the mounting of a turbine assembly 10, 90, 100, 200 on the apex of a roof, the height at which the turbine assembly 10, 90, 100, 200 is mounted will be dependent upon a number of factors. These factors include the pitch angle of the roof, the roughness of the surface of the roof, and the size of the roof; all these factors have a direct impact upon the formation, type and thickness of the air flow boundary layer present along the roofs surface and the variation of air flow velocity above the surface of the roof.

A turbine assembly may be connected to an electrical generator 150 either directly or via a transmission means 160. The generator 150 may be located in a weatherproof housing at one end of the turbine assembly. Alternatively, if the installation comprises a plurality of turbine assemblies, as shown in FIG. 14, each turbine assembly may include a separate generator 150. In this embodiment it is possible to use contra-rotating turbine rotors on alternate modules as shown in the partial section view in FIG. 16. FIG. 16 illustrates the use of segmented Savonius turbine rotors, the top side of the turbine rotor 202 rotating into the page and the top side of the turbine rotor 204 rotating out of the page, it is however possible that any contra-rotating blade geometry may be applied. This optional feature allows the possibility of turning the generator at a faster rotational speed by driving the stator and rotor of an electrical generator 150 in opposite directions by coupling the generator centrally between modules, the turbine rotor 202 on one side driving the generator stator 206 and the turbine rotor 204 on the other side driving the generator rotor 208.

The use of contra-rotating turbine rotors to drive an electrical generator at an increased rotational speed is known in the field of axial flow wind turbines and is described in Patent Application GB2441770.

Alternatively, the generator 150 may be located away from the end of the turbine assembly and driven through a transmission means 160. FIG. 15 shows a turbine assembly installation according to the third embodiment of the invention in which the generator 150 is located inside the roof space of the building, and is connected to the rotor 20 by a gear train, belt, chain or other transmission means 160.

Various alternative arrangements of the rotor 20 will now be discussed. These alternative rotor arrangements may be employed in any of the embodiments of the invention which have been described above.

The rotor 20 preferably has between 2 and 20 blades 30 and more preferably between 2 and 5 blades 30. However, other embodiments of the invention may have any number of blades 30.

The rotor 20 may have one of several different blade cross section geometries. In one embodiment, shown in FIG. 17, the blades 30 project perpendicularly from the hub 22, and have a curved portion 32 at their tip. This improves the efficiency of the rotor 20 when used in air flows which are directed towards the concave side of the curved portion 32 of the blade 30. Rotors 20 having this geometry therefore have a preferred direction of rotation, i.e. they experience more drag on one side of the blade 30 than on the other side of the blade 30.

Alternatively, as illustrated in FIG. 18, the rotor 20 may have two separate curved blades 34 with or without a central hub 22. The two blades 34 are oriented so as to overlap at their inner edges with the inner edge of each blade extending beyond the axis of rotation 94 into the opposite side of the rotor to that containing the main portion of the blade. A turbine assembly having this arrangement of blades 34 is commonly known as a Savonius turbine. The degree of curvature on each of the curved blades 34 can be varied. For example, FIG. 19 shows another embodiment of a Savonius rotor in which the innermost portion of each blade 34 is substantially linear, each blade 34 being positioned to provide a degree of overlap between the inner edges of the blades 34.

The gap between the inner edges of the two blades 34 is configured to allow a portion of the air flow impinging on one blade 34 to "cross feed" to the opposite blade 34 thus providing additional motive power. This cross feed is illustrated in FIG. 19 where the air flow 80 impinges on one blade 34 and a portion 82 of this flow is directed between the two blades 34 and impinges on the second blade 34, allowing the second blade 34 to also extract useful energy from the air flow.

The rotor 20 may have one of several different arrangements of the blades 30 along the length of the rotor 20. In one embodiment, shown in FIG. 20, each of the blades 30 adjoins the hub 22 parallel to the axis of rotation 94 of the rotor 20.

Alternatively, each of the blades 30 adjoins the hub 22 in a helical path along the length of the rotor 20. FIG. 21 illustrates such a helical blade 30 arrangement in which the tip of each blade 30 forms a helix and the surface of each blade 30 forming a helicoid. This type of blade geometry may be referred to as a single spiral rotor.

This single spiral rotor geometry results in a portion of at least one blade 30 always being substantially perpendicular to the air stream (assuming that the rotor spiral twists through at least 360°/(number of blades)). This ensures that the rotor 20 can start from any stationary position assuming the airflow enters the assembly substantially perpendicular to the axis of rotation 94 of the rotor.

Alternatively, each of the blades 30 adjoins the hub 22 along a path which is formed by a right handed helix originating from one end of the rotor 20 and a left handed helix originating from the opposite end of the rotor 20, the two helices meeting in the centre of the rotor 20. This arrangement of blades is shown in FIG. 22 and may be referred to as a double spiral rotor.

Turbine assemblies 10, 90, 100, 200 according to the invention which utilise a single spiral rotor may be optimized for air flows which impinge on the blade 30 in a direction perpendicular to the blade surface. The angle of this air flow relative to the axis of rotation 94 of the turbine assembly will vary from 90°, with the degree of variation being dependent upon the degree of helical twist on the blade. In this way, it is possible to optimize the blade geometry for a given installation orientation.

For example, FIG. 21 shows a single spiral rotor 20 the axis 94 of which is aligned in a North-South direction, and the blade tip curvatures are arranged such that air flows in an East to West direction travel under the rotor 20. The spiral geometry of the rotor shown in FIG. 21 results in the blade surfaces being aligned so as to face a more Northerly direction. This arrangement of rotor 20 will therefore favour air flows from the North East over flows from the South East.

Similarly, for air flows in a West to East direction, this blade geometry and curvature will result in air flowing over the rotor 20. By the same argument as made previously, this rotor 20 arrangement will favor air flows from the North West over flows from the South West.

This asymmetric preference for wind direction exhibited by the single spiral rotor geometry can be minimized by using a rotor 20 having a double spiral rotor geometry, as shown in FIG. 22. Thus, a rotor 20 having a double spiral geometry provides the advantages of spiral rotor geometry without the limitation of favouring air flows from a particular direction.

Consequently, the rotor parameters, spiral type, blade tip curvature direction and spiral direction can be selected so as to provide the optimum output from the turbine assembly 10, 90, 100, 200 for a given installation direction and prevailing air flow conditions.

Alternatively, the rotor 20 may include blades 30 which are aligned parallel to the axis of rotation 94 of the rotor 20 together with a plurality of separator discs 70, as shown in FIG. 23. These separator discs 70 are located concentrically with the axis of rotation 94 of the rotor and are spaced along the rotor 20 so as to divide the rotor 20 into segments. The separator discs 70 may take the form of solid discs, perforated discs or partial discs. While the separator discs 70 are generally arranged to be perpendicular to the axis of rotation 94 of the rotor 20, other orientations are envisaged.

Each of the segments may be rotated through a pre-determined angle to produce a rotor 20 having blade segments which are disposed helically around the rotor 20. This provides the advantages of a single spiral rotor (self starting and smoother power output) with the simple construction of the parallel bladed rotor 20.

An advantage of separator discs 70 is that they can limit span wise air flows along the rotor 20 and thus allow energy to be transferred from the air stream to the rotor 20, equally across the span of the rotor 20 and in the area where the air first impinged upon the blades. This can be especially important for single and double spiral rotors in which the wind direction varies from the optimum, and where air flow would otherwise roll along the length of the rotor 20.

The separator discs 70 can increase the rigidity of the rotor 20 assembly. They can also provide for modular rotor construction which may decrease construction costs and can allow for replacement of sections in service.

A rotor 20 having Savonius style blades 34 may also be fitted with separator discs 70, as can be seen in FIG. 24.

In a further embodiment, a rotor 20 having Savonius style blades 34 and separator discs 70 may also include a hub 22.

If several buildings or structures are each fitted with a roof mounted turbine assembly according to the invention and an associated electrical generator 150, the electrical outputs from the generators 150 may be interconnected to form a community generating scheme. Each individual turbine assembly 10, 90, 100, 200 may optionally have a rotor geometry optimized for the prevailing wind speed and direction relative to the orientation of the roof of the building.

FIG. 25 shows a schematic arrangement of one embodiment of such a community generating scheme. This arrangement would allow the users of the scheme to consume electricity generated by the turbine assemblies 10, 90, 100, 200, and other generating devices using renewable energy sources such as photovoltaic cells, in preference to electricity supplied from a remote generating site. Surplus electricity generated by the turbine assemblies 10, 90, 100, 200 could be stored in batteries for later use. Alternatively, such surplus electricity could be used to heat water, operate ground-source, water-source or air-source heat pumps or could be returned to a power distribution network on a commercial basis.

The turbine assembly 10, 90, 100, 200 lends itself to other applications including installation on temporary structures and vehicles. The turbine assembly 10, 90, 100, 200 may also be operated in an airborne arrangement, in which it is suspended from a kite.

A turbine assembly according to the invention may have any combination of one or more of the features described above.

The invention claimed is:

1. A transverse flow wind turbine assembly comprising, a rotor having a plurality of blades, and a shroud comprising at least three shroud portions, said shroud portions extending axially along the rotor and around the rotor to at least partially enclose the rotor, and said shroud portions being rotationally adjustable in order to expose a portion of the rotor to the wind, and wherein the shroud, in use, defines a variable inlet and a variable outlet, and wherein, in use, the inlet area and outlet area are variable independently of each other in area and in angular position around the circumference of the turbine, and wherein adjustment of the area of the inlet area does not result in the same magnitude of adjustment in area of the outlet area, and wherein adjustment of the position of the inlet area does not result in the same magnitude of adjustment of the position of the outlet area.

2. A transverse flow wind turbine according to claim 1 wherein one or more of said shroud portions are spaced apart transversely from the axis of rotation of the rotor by a distance that is different to the distance by which the one or more other shroud portions are spaced apart transversely from the axis of rotation of the rotor.

3. A transverse flow wind turbine according to claim 1, wherein the distance by which one or more of said shroud portions are spaced apart, transversely from the axis of rotation of the shroud portion, varies with the angular position of the respective shroud portion relative to the axis of rotation of the shroud portion.

4. A transverse flow wind turbine according to claim 1, wherein the distance by which one or more of said shroud portions are spaced apart, transversely from the axis of rotation of the shroud portion, varies with the angular position around the respective shroud portion.

5. A transverse flow wind turbine according to claim 1, wherein the axis of rotation of one or more of said shroud portions and the axis of rotation of the rotor are coaxial.

6. A transverse flow wind turbine according to claim 1, wherein the axis of rotation of one or more of said shroud portions are offset from the axis of rotation of the rotor.

7. A transverse flow wind turbine according to claim 1, wherein the axis of rotation of one or more of said shroud portions varies relative to the axis of rotation of the rotor as the one or more shroud portions rotate.

8. A transverse flow wind turbine according to claim 1, wherein one or more of said shroud portions includes an inlet guide extending axially along the shroud portion.

9. A transverse flow wind turbine according to claim 1, wherein one or more of said shroud portions includes an exhaust guide the exhaust guide extending axially along the shroud portion.

10. A transverse flow wind turbine according to claim 1, wherein one or more of said shroud portions comprises a flow reversal device.

11. A transverse flow wind turbine according to claim 1, wherein one or more of said shroud portions includes a plurality of apertures.

12. A transverse flow wind turbine according to claim 1, further comprising a vibration sensor for measuring vibration of the turbine.

13. A method of operating a transverse flow wind turbine assembly according to claim 1, the rotor being connected to an electrical generator; the method comprising the steps of:
adjusting the rotational position of the shroud portions;
determining the electrical power output from the electrical generator; and
repeating the above steps in order to achieve required electrical power output from the electrical generator.

14. A method of operating a transverse flow wind turbine assembly in accordance with claim 13, the turbine assembly further comprising a plurality of sensors, each sensor being adapted to sense a variable, the method comprising the additional initial steps of:
receiving an input from one or more of the plurality of sensors;
comparing the input to a predetermined value; and
using the results from the comparison step to determine the required adjustment to the position of the shroud.

15. A method of operating a transverse flow wind turbine assembly in accordance with claim 14, wherein the variable is selected from the group comprising wind speed, wind direction, temperature, humidity, vibration and pressure.

16. A roof for a building comprising a transverse flow wind turbine assembly according to claim 1, the roof comprising an apex, the turbine assembly being positioned substantially parallel to the apex of the roof.

17. A series of transverse flow wind turbines modules installed in series along the apex of a roof in accordance with claim 16, wherein the rotors of alternate turbine modules are contra-rotating, a generator coupled centrally between alternate modules, the rotor of one module driving the stator of the generator and the rotor of the adjacent module driving the rotor of the generator.

18. A plurality of transverse flow wind turbine assemblies according to claim 1, wherein each turbine assembly drives an electrical generator the electrical outputs from each respective electrical generator being connected to a local electrical power distribution network, the electrical power generated by the turbine assemblies being supplied to local consumers in response to their electrical power requirements, in preference to the supply of electrical power from a remote generating site.

19. A plurality of transverse flow wind turbine assemblies according to claim 18, wherein the electrical outputs from other devices using renewable energy, such as photovoltaic cells, may be connected to the local electrical power distribution network.

20. A plurality of transverse flow wind turbine assemblies according to claim 18 wherein each of the turbine assemblies is mounted on a structure.

* * * * *